United States Patent
Nagamine et al.

(10) Patent No.: US 7,881,758 B2
(45) Date of Patent: Feb. 1, 2011

(54) ELECTRONIC APPARATUS HAVING ROTATING DISPLAY HOUSING

(75) Inventors: Tomoyuki Nagamine, Kawasaki (JP); Tetsuya Hori, Kawasaki (JP); Shigeru Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 934 days.

(21) Appl. No.: 11/627,435

(22) Filed: Jan. 26, 2007

(65) Prior Publication Data

US 2008/0076479 A1 Mar. 27, 2008

(30) Foreign Application Priority Data

Sep. 22, 2006 (JP) .............................. 2006-257319

(51) Int. Cl.
*H04M 1/00* (2006.01)
(52) U.S. Cl. ................ 455/575.1; 455/90.3; 455/575.3; 455/575.4; 455/550.1; 455/566
(58) Field of Classification Search ............. 455/575.1, 455/575.2, 575.3, 575.4, 550.1, 566, 90.3
See application file for complete search history.

(56) References Cited

U.S. PATENT DOCUMENTS

| | | | |
|---|---|---|---|
| 7,440,783 B2 * | 10/2008 | Hyun | 455/575.3 |
| 7,467,000 B2 * | 12/2008 | Shiba | 455/575.8 |
| 2006/0019726 A1 * | 1/2006 | Park et al. | 455/575.1 |
| 2006/0168756 A1 | 8/2006 | Sato et al. | |
| 2007/0135181 A1 * | 6/2007 | Ohki et al. | 455/575.1 |

FOREIGN PATENT DOCUMENTS

| | | |
|---|---|---|
| JP | 10-13289 A | 1/1998 |
| JP | 2001-156893 A | 6/2001 |
| JP | 2004-270821 | 9/2004 |
| JP | 2005-127449 A | 5/2005 |
| JP | 2006-022868 | 1/2006 |

(Continued)

OTHER PUBLICATIONS

Korean Office Action dated Nov. 11, 2007, Application No. 10-2007-0009268.
Chinese Office Action, mailed Nov. 6, 2009 by the Chinese Intellectual Property Office in connection with CN Patent App. No. 200710005166.2. Full English-language translation.

(Continued)

*Primary Examiner*—Charles N Appiah
*Assistant Examiner*—Kwasi Karikari
(74) *Attorney, Agent, or Firm*—Fujitsu Patent Center

(57) ABSTRACT

The present invention relates to an electronic apparatus including a housing unit of which the angle can be varied by a rotation mechanism and is directed to improve the fixation precision of the housing unit that can be fixed at predetermined angles. The apparatus includes a supporting frame unit (movable arm unit), a rotation supporting unit (rotating module) installed on the supporting frame unit, a housing unit (movable housing unit) that is fixed on the rotation supporting unit and can be rotated by the rotation supporting unit, and a rotation locking mechanism that is installed away from the center of rotation of the rotation supporting unit and, when the housing unit is rotated to a predetermined angle, holds the supporting frame unit and the housing unit in a locked state.

23 Claims, 23 Drawing Sheets

FOREIGN PATENT DOCUMENTS

| | | |
|---|---|---|
| JP | 2006-80713 A | 3/2006 |
| JP | 2006-242220 A | 9/2006 |
| KR | 1020040105629 | 12/2004 |
| KR | 1020060094506 | 8/2006 |
| WO | WO-2006/096004 | 9/2006 |

OTHER PUBLICATIONS

"Japanese Office Action", mailed Oct. 26, 2010 by JP Patent Office for corresponding JP Patent App. No. 2006-257319, partial English translation.

* cited by examiner

ELECTRONIC APPARATUS HAVING ROTATING DISPLAY HOUSING

CROSS-REFERENCE TO RELATED APPLICATIONS

This application is based upon and claims the benefit of priority from the prior Japanese Patent Application No. 2006-257319, filed on Sep. 22, 2006, the entire contents of which are incorporated herein by reference.

BACKGROUND OF THE INVENTION

1. Field of the Invention

The present invention relates generally to an electronic apparatus such as a portable terminal apparatus including a rotatable displaying unit such as a liquid crystal display unit component, and more particularly, to an electronic apparatus including a movable housing unit that mounts a displaying unit and can be locked at predetermined angles.

2. Description of the Related Art

For an electronic apparatus such as a portable terminal apparatus including a rotatable displaying unit component, when the posture of the displaying unit component is adjusted by rotating the component from a vertically oriented posture to a horizontally oriented posture thereof and vice versa, the displaying unit component needs to be fixed at predetermined displaying positions. Fixing at such displaying positions needs mechanical operations.

For an electronic apparatus including such a rotation mechanism, Japanese Patent Application Laid-Open Publication No. 2005-127449 discloses a two-shaft-hinge rotation mechanism and a portable telephone including the rotation mechanism and that sliding friction torque and clicking torque can be generated by exerting a load caused by a coil spring between a sliding member or a rotation shaft supporting member and a pressure-welding member (abstract, FIG. 1, etc.).

Japanese Patent Application Laid-Open Publication No. 1998-13289 discloses that, for a battery holding structure of a portable communication apparatus, a deformed leaf spring is protruded from a main body and a recessed portion into which the leaf spring enters is provided for a rotatable battery and, thereby, the leaf spring is attached or detached to the recessed portion of the battery due to rotation of the battery (abstract, FIG. 2, etc.).

Japanese Patent Application Laid-Open Publication No. 2001-156893 discloses a locking mechanism that locks rotation of a displaying unit component and a releasing mechanism therefor for an apparatus configured by fitting a rotatable displaying unit component rotatably from a vertically oriented posture to a horizontally oriented posture thereof and vice versa to a foldable main body (abstract, FIGS. 5 and 11, etc.).

However, in the case of the configuration adapted to generate sliding friction torque and clicking torque by exerting a load caused by a coil spring on a rotation mechanism using a two-shaft hinge (the above '499 publication), the stability thereof is poor because the load concentrates on the hinge and the fixation strength of a member supported by the two-shaft hinge is low or the fixation strength varies, etc. In the case of the connecting structure including the leaf spring and the recessed portion (the above '289 publication), though the structure thereof is simple, the stability thereof is insufficient. In the case of the setting mechanism that includes a thin bar to be manually operated between a vertically oriented posture (a 0-degree position) and a horizontally oriented posture (a 90-degree position) thereof and a recessed portion of the displaying unit and that holds an inserting angle, as a rotation locking setting and a releasing setting of the locking setting (the above '893 publication), the operability thereof is poor.

A structure can be used that holds a displaying unit component at a predetermined angle inside a rotating module (cam structure) connecting the displaying unit component and an arm unit. However, problems have arisen on the fixation that the holding angle for the rotating module is not constant (for example, dispersion of about ±0.7 degrees is present) and, therefore, a fitting gap is generated between a fixed unit and a displaying unit component in a closed state and an inclination of a displayed screen is generated in an opened state, etc.

The above '499 publication (abstract, FIG. 1, etc.), the above '289 publication (abstract, FIG. 2, etc.), and the above '893 publication (abstract, FIGS. 5 and 11, etc.) have no disclosure and no suggestion for the above requirements and problems and also have no disclosure and no suggestion of configurations to solve the requirements and the problems.

SUMMARY OF THE INVENTION

The object of the present invention relates to an electronic apparatus that includes a housing unit of which the angle can be varied by a rotation mechanism, and is to improve the fixation precision of the housing unit fixed at a predetermined angle.

Further object of the present invention relates to an electronic apparatus that includes a housing unit of which the angle can be varied by a rotation mechanism, and is to improve the rotational operability of the housing unit and to improve the fixation precision of the housing unit fixed at a predetermined angle.

Yet further object of the present invention relates to an electronic apparatus that includes a housing unit of which the angle can be varied by a rotation mechanism, and is to improve the fixation of the housing unit fixed at a predetermined angle.

Yet further object of the present invention relates to an electronic apparatus that includes a housing unit of which the angle can be varied by a rotation mechanism, and is to facilitate reduction of the thickness of the apparatus.

To achieve the above objects, the present invention is an electronic apparatus such as a portable terminal apparatus including a housing unit that is fitted rotatably to a rotation supporting unit mounted on a supporting frame unit. By mounting a rotation locking mechanism separating away from the center of the rotation of the rotation supporting unit, the supporting frame unit and the housing unit can be held in a locked state at a predetermined angle when the housing unit is rotated to a predetermined angle. Because the rotation supporting unit and the rotation locking mechanism are each configured independently and are separated away from each other, compared to the case where the housing unit is fixed at a predetermined rotation angle by the rotation supporting unit in proportion to the separation distance, for a same fixing force, the fixing strength can be enhanced and the shaking angle is reduced and, therefore, the fixation precision of the housing unit can be improved. The fixing strength of the housing unit against the supporting frame unit can be enhanced and the shaking angle of the housing unit can be reduced and, therefore, the fixation at a predetermined angle can be improved. Thereby, the above objects can be achieved.

In order to achieve the above objects, according to a major aspect of the present invention there is provided an electronic apparatus, comprising a supporting frame unit; a rotation supporting unit installed on the supporting frame unit; a housing unit that is fixed on the rotation supporting unit and can be rotated by the rotation supporting unit; and a rotation locking mechanism that is installed away from the center of rotation of the rotation supporting unit and, in case where the housing unit is rotated to a predetermined angle, holds the supporting frame unit and the housing unit in a locked state.

Preferably, rotating faces respectively of the supporting frame unit and the housing unit are closely contacted slidably with each other. Preferably, the rotation locking mechanism comprises a locking pin; a pin engaging portion that engages with the locking pin; and an elastic portion that exerts an elastic force on the locking pin or the pin engaging portion, and the locked state is generated by the engagement of the locking pin and the pin engaging portion. Preferably, the apparatus comprises the pin engaging portion on the supporting frame unit or the housing unit, and the locking pin on the housing unit or the supporting frame unit, and the elastic portion exerts an elastic force on the pin engaging portion and/or the locking pin. Preferably, the electronic apparatus comprises a grooved portion to be inserted into the pin engaging portion that is moved by the rotation of the housing unit, in the face of the housing unit or the supporting frame unit; and the locking pin that is slid against the pin engaging portion in the direction of the radius of the rotation of the housing unit, inside the supporting frame unit or the housing unit. Preferably, the electronic apparatus comprises stopper mechanisms at the starting point of rotation and the ending point of the rotation of the housing unit in the supporting frame unit and/or the housing unit. Preferably, the housing unit comprises a displaying unit. Preferably, the pin engaging unit comprises a recessed portion into which the locking pin is engaged. Preferably, the rotation locking mechanism is installed at a position opposite to the opening and closing mechanism sandwiching the center of the rotation of the rotation supporting unit. Preferably, the elastic portion is a spring. Preferably, the supporting frame unit is coupled with the fixed housing unit through an opening and closing mechanism and can be opened and closed against the fixed housing unit by the opening and closing mechanism. Preferably, the electronic apparatus comprises a sliding sheet between sliding faces respectively of the supporting frame unit and the housing unit. Preferably, the stopper mechanism comprises a grooved portion and a pin engaging portion.

In order to achieve the above objects, according to a second aspect of the present invention there is provided a portable terminal apparatus, comprising a movable arm unit fitted being able to be opened and closed to a fixed housing unit with an opening and closing mechanism installed therebetween; a rotation supporting unit installed in the movable arm unit; a movable housing unit that is fixed to the rotation supporting unit and can be rotated by the rotation supporting unit; and a rotation locking mechanism that is installed away from the center of rotation of the rotation supporting unit and outside the rotation supporting unit and, in case where the movable housing unit is rotated to a predetermined angle, holds the movable arm unit and the movable housing unit in a locked state.

Preferably, rotation faces respectively of the movable arm unit and the movable housing unit are closely contacted slidably with each other. Preferably, the rotation locking mechanism comprises a locking pin; a pin engaging portion that engages with the locking pin; and an elastic portion that exerts an elastic force on the locking pin or the pin engaging portion, wherein the locked state is generated by the engagement of the locking pin and the pin engaging portion. Preferably, the apparatus comprises the pin engaging portion on the movable arm unit or the movable housing unit, and the locking pin on the movable housing unit or the movable arm unit, wherein the elastic portion exerts an elastic force on the pin engaging portion and/or the locking pin. Preferably, the portable terminal apparatus comprises a grooved portion to be inserted into the pin engaging portion that is moved by the rotation of the movable housing unit, in the face of the movable housing unit or the movable arm unit; and the locking pin that is slid against the pin engaging portion in the direction of the radius of the rotation of the movable housing unit, inside the movable arm unit or the movable housing unit. Preferably, the portable terminal apparatus comprises stopper mechanisms at the starting point of rotation and the ending point of the rotation of the movable housing unit in the movable arm unit and/or the movable housing unit. Preferably, the movable housing unit comprises a displaying unit. Preferably, the pin engaging unit comprises a recessed portion into which the locking pin is engaged. Preferably, the rotation locking mechanism is installed at a position opposite to the opening and closing mechanism sandwiching the center of the rotation of the rotation supporting unit. Preferably, the elastic portion is a spring. Preferably, the portable terminal apparatus comprises a sliding sheet between sliding faces respectively of the movable arm unit and the movable housing unit. Preferably, the stopper mechanism comprises a grooved portion and a pin engaging portion.

The features and advantages of the present invention are as follows.

(1) For an electronic apparatus that includes a housing unit of which the angle can be varied by a rotation mechanism, the housing unit mounted rotatably on a supporting frame unit can be fixed at a predetermined angle and this contributes to improvement of fixation precision of the housing unit.

(2) For an electronic apparatus that includes a housing unit of which the angle can be varied by a rotation mechanism, rotational operability of the housing unit can be improved.

(3) For an electronic apparatus that includes a housing unit of which the angle can be varied by a rotation mechanism, the present invention contributes to reduction of the thickness of the apparatus.

Other objects, features, and advantages of the present invention will be more clear by referencing the accompanying drawings and the embodiments herein.

DETAILED DESCRIPTION OF THE PREFERRED EMBODIMENTS

First Embodiment

Figure 1:
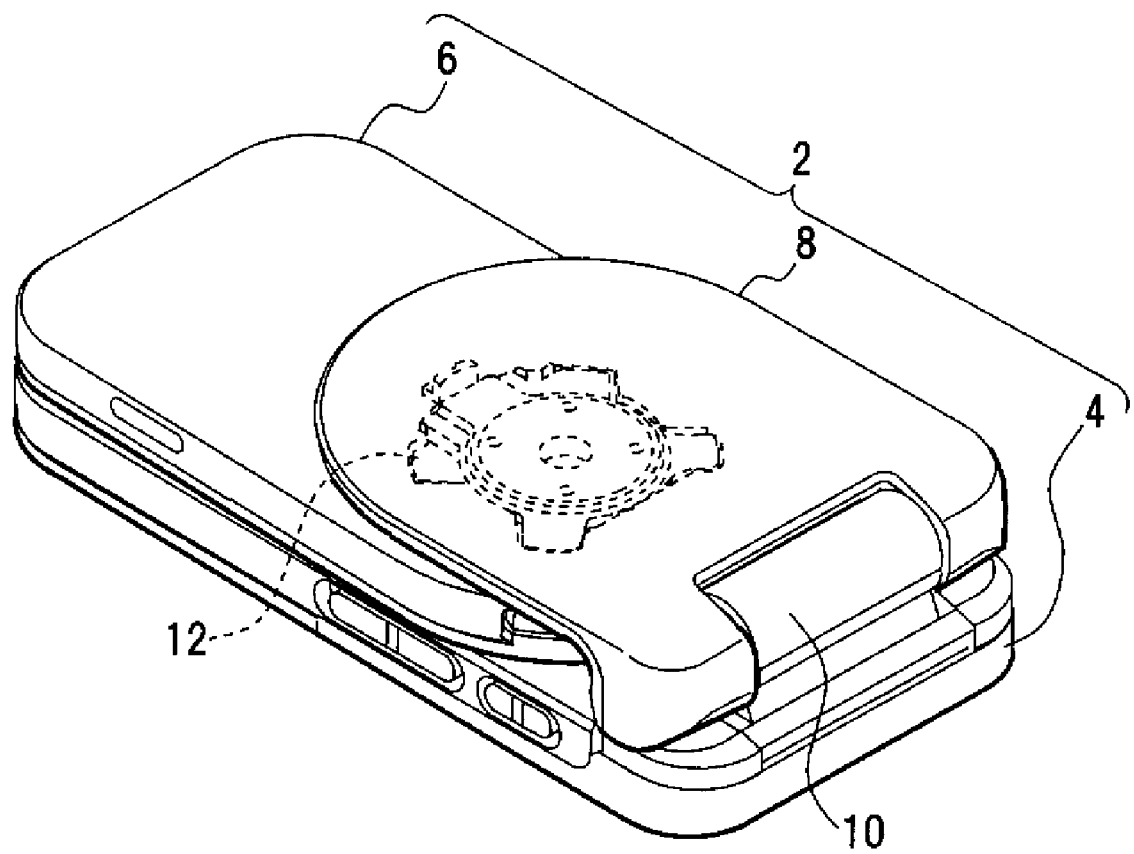
FIG. 1 depicts a perspective view of a portable terminal apparatus according to a first embodiment.
Figure 2:
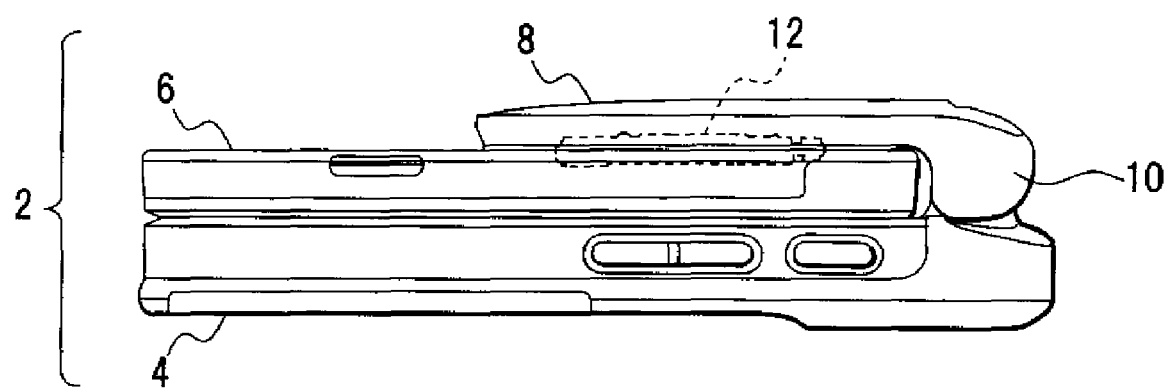
FIG. 2 depicts a side view of a closed state of the portable terminal apparatus.
Figure 3:
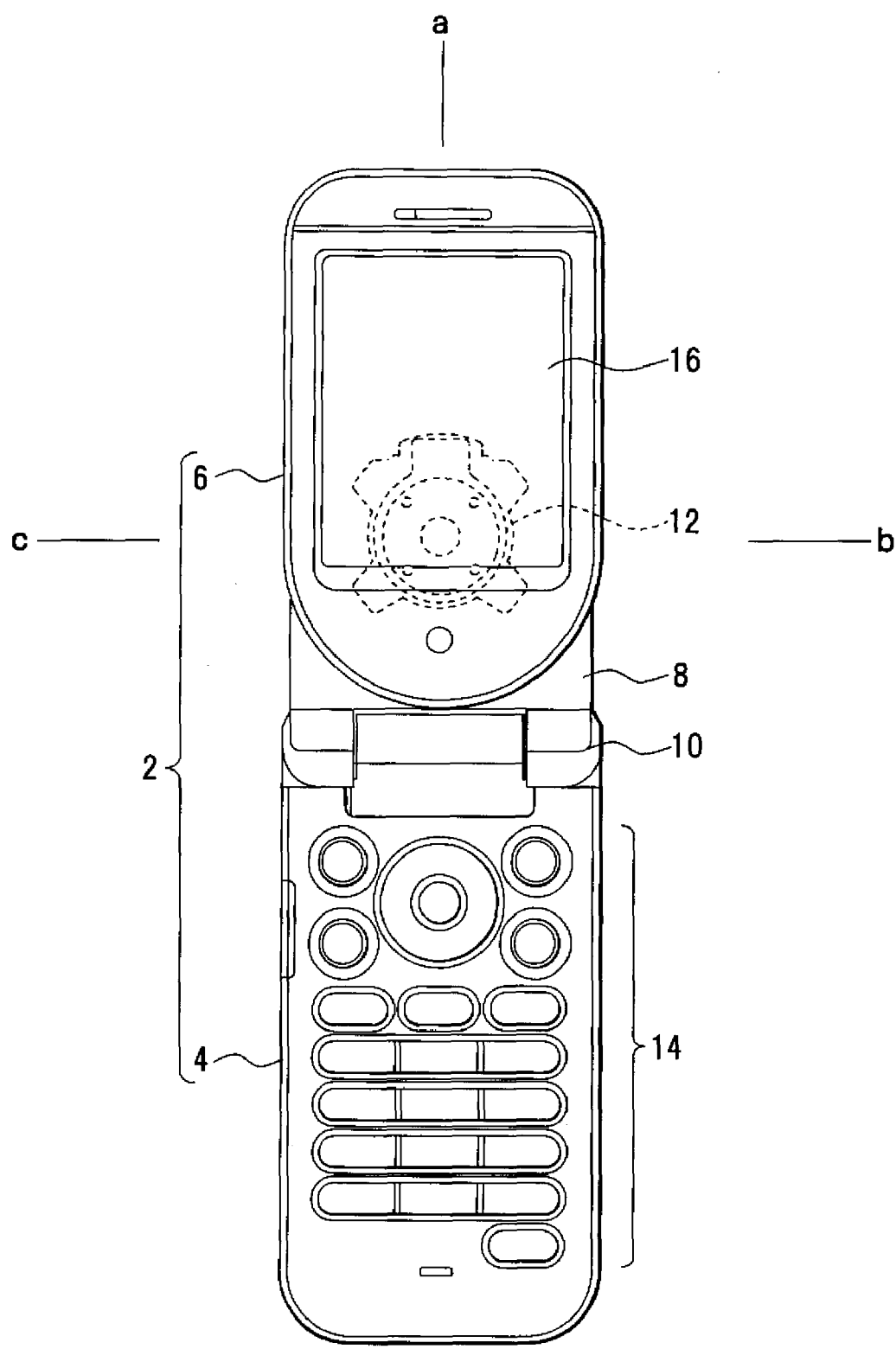
FIG. 3 depicts a front view of an opened state of the portable terminal apparatus.
Figure 4:
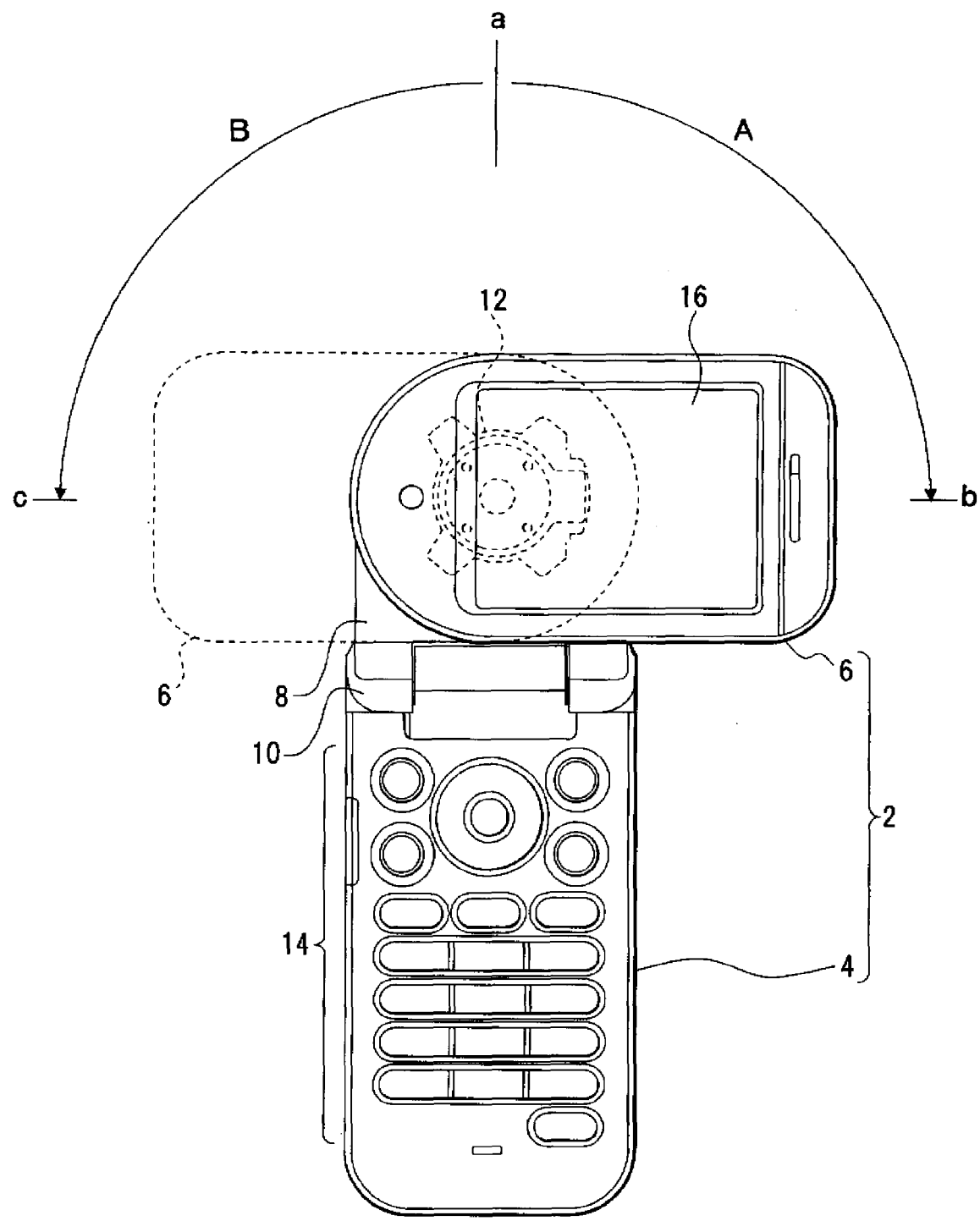
FIG. 4 depicts a clockwise rotation (a counterclockwise rotation) of a movable housing of the portable terminal apparatus in the opened state thereof.
Figure 5:
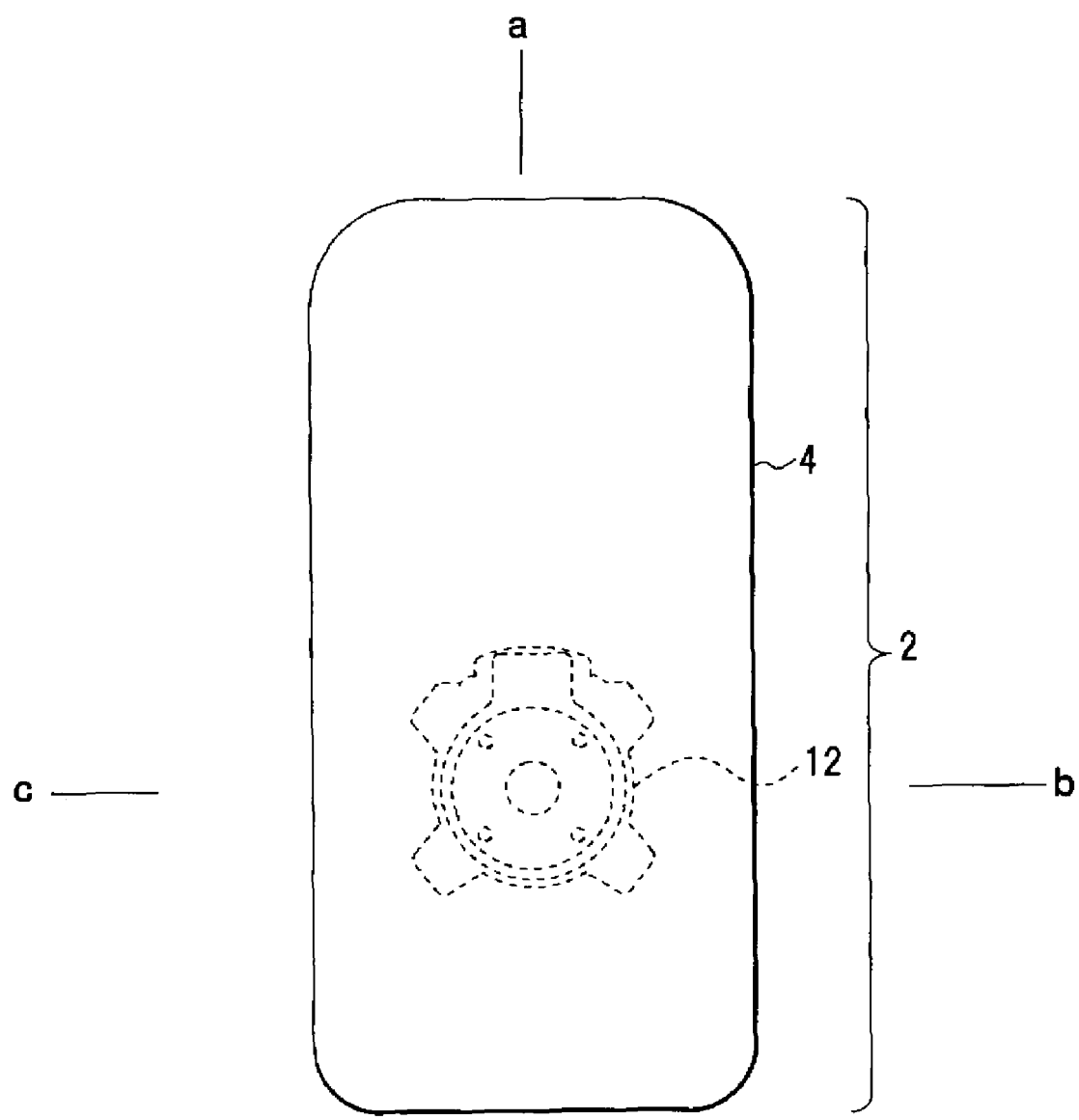
FIG. 5 depicts a rear view of the portable terminal apparatus in the closed state thereof.
Figure 6:
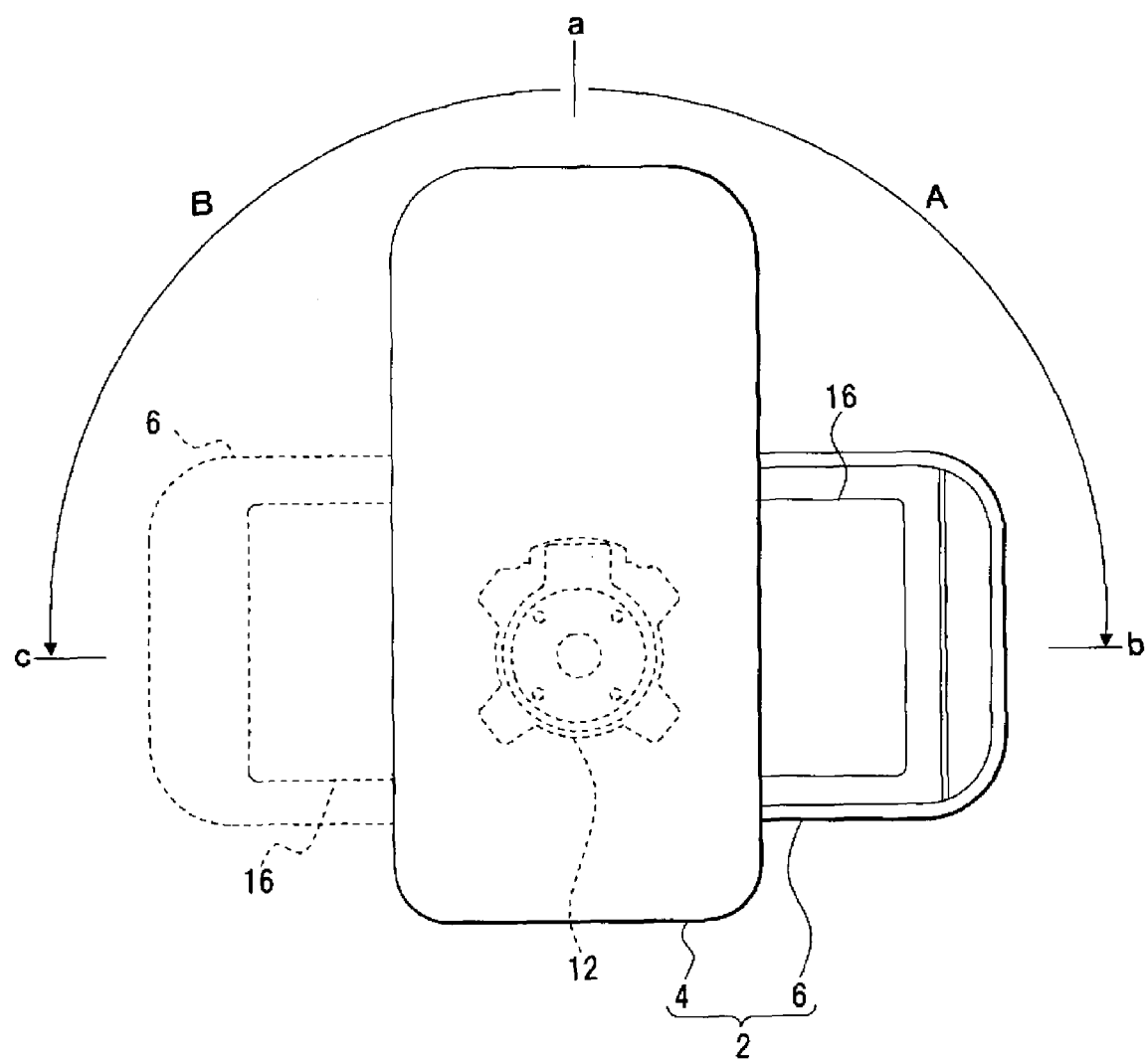
FIG. 6 depicts a clockwise rotation (a counterclockwise rotation) of the movable housing unit of the portable terminal apparatus in a closed state thereof.

Description will be given for a first embodiment of the present invention referring to FIGS. 1 to 6. FIG. 1 depicts a perspective view of a portable terminal apparatus. FIG. 2 depicts a side view of a closed state of the portable terminal apparatus. FIG. 3 depicts a front view of an opened state of the portable terminal apparatus. FIG. 4 depicts a clockwise rotation (a counterclockwise rotation) of a movable housing unit of the portable terminal apparatus in the opened state thereof. FIG. 5 depicts a rear view of the portable terminal apparatus in the closed state thereof. FIG. 6 depicts a clockwise rotation (a counterclockwise rotation) of the movable housing unit of the portable terminal apparatus in the closed state thereof.

A portable terminal apparatus 2 is an example of an electronic apparatus including a plurality of movable units such as an opening and closing unit and a rotating unit and, as shown in FIGS. 1 and 2, includes a fixed housing unit 4 as a first housing unit and a movable housing unit 6 as a second housing unit. A movable arm unit 8 as a supporting frame unit is fitted to a fixed housing unit 4 by a hinging mechanism 10 that is an opening and closing mechanism. A rotation module 12 as a rotation supporting unit is fitted to the movable arm unit 8. The movable housing unit 6 is fixed to the rotation module 12 and the movable housing unit 6 can be rotated by the rotation module 12.

As shown in FIG. 3, the fixed housing unit 4 mounts an input operating unit 14 including a plurality of keys such as symbol keys and cursor keys, etc., and the movable housing unit 6 mounts a displaying unit 16 as a displaying unit including an LCD (Liquid Crystal Display) device, etc.

According to the portable terminal apparatus 2, by including the hinging mechanism 10 and the rotation module 12 as the movable units, the movable housing unit 6 can be opened and closed with the movable arm unit 8 or the movable housing unit 6 can be rotated to a predetermined angle. As shown in FIGS. 1 and 2, the movable housing unit 6 can be closed with the movable arm unit 8 to the fixed housing unit 4 or, as shown in FIG. 3, can be maintained in the opened state. The movable arm unit 8 and the movable housing unit 6 can also be halted and held still on the way from the closed state to the opened state. In the opened state shown in FIG. 3: "a" denotes a central fixing position (the starting point of a (counter) clockwise rotation) that coincides with the center line of the movable housing unit 6; "b" denotes a right-side fixing position (the right-side rotation ending point) of the movable housing unit 6; and "c" denotes a left-side fixing position (the left-side rotation ending point) of the movable housing unit 6.

As shown in FIG. 4, in the opened state, the position of the movable housing unit 6 can be changed to form an L-shape relative to the fixed housing unit 4 by rotating and fixing the unit 6 from the central fixing position a to the right-side fixing position b in a direction indicated by an arrow "A" (clockwise) or by rotating and fixing the unit 6 from the central fixing position a or right-side fixing position b to the left-side fixing position c in a direction indicated by an arrow "B" (counterclockwise). The movable housing unit 6 can also be halted by halting torque that the rotating module 12 has, on the way to the right-side rotation ending point b or the left-side rotation ending point c, and can be held still at the position at which the unit 6 is halted.

In the closed state shown in FIG. 5, similarly, the right-side fixing position b (the right-side rotation ending point) of the movable housing unit 6 and the left-side fixing position c (the left-side rotation ending point) of the movable housing unit 6 are set relative to the central fixing position a (the starting point of the (counter) clockwise rotation) of the movable housing unit 6. That is, because the movable housing unit 6 is supported on the movable arm unit 8 through the rotating module 12, as shown in FIG. 6, the position of the movable housing unit 6 can be changed to form an L-shape relative to the fixed housing unit 4 by rotating and fixing the unit 6 from the central fixing position a to the right-side fixing position b in a direction indicated by an arrow "A" (clockwise) or by rotating and fixing the unit 6 from the central fixing position a to the left-side fixing position c in a direction indicated by an arrow "B" (counterclockwise). The movable housing unit 6 can also be halted by halting torque that the rotating module 12 has, on the way to the right-side rotation ending point b or the left-side rotation ending point c, and can be held still at the position at which the unit 6 is halted. By the above rotational operations, the contents of the display on the displaying unit 16 on the movable housing unit 6 can be visually confirmed from the rear side of the fixed housing unit 4.

Figure 7:
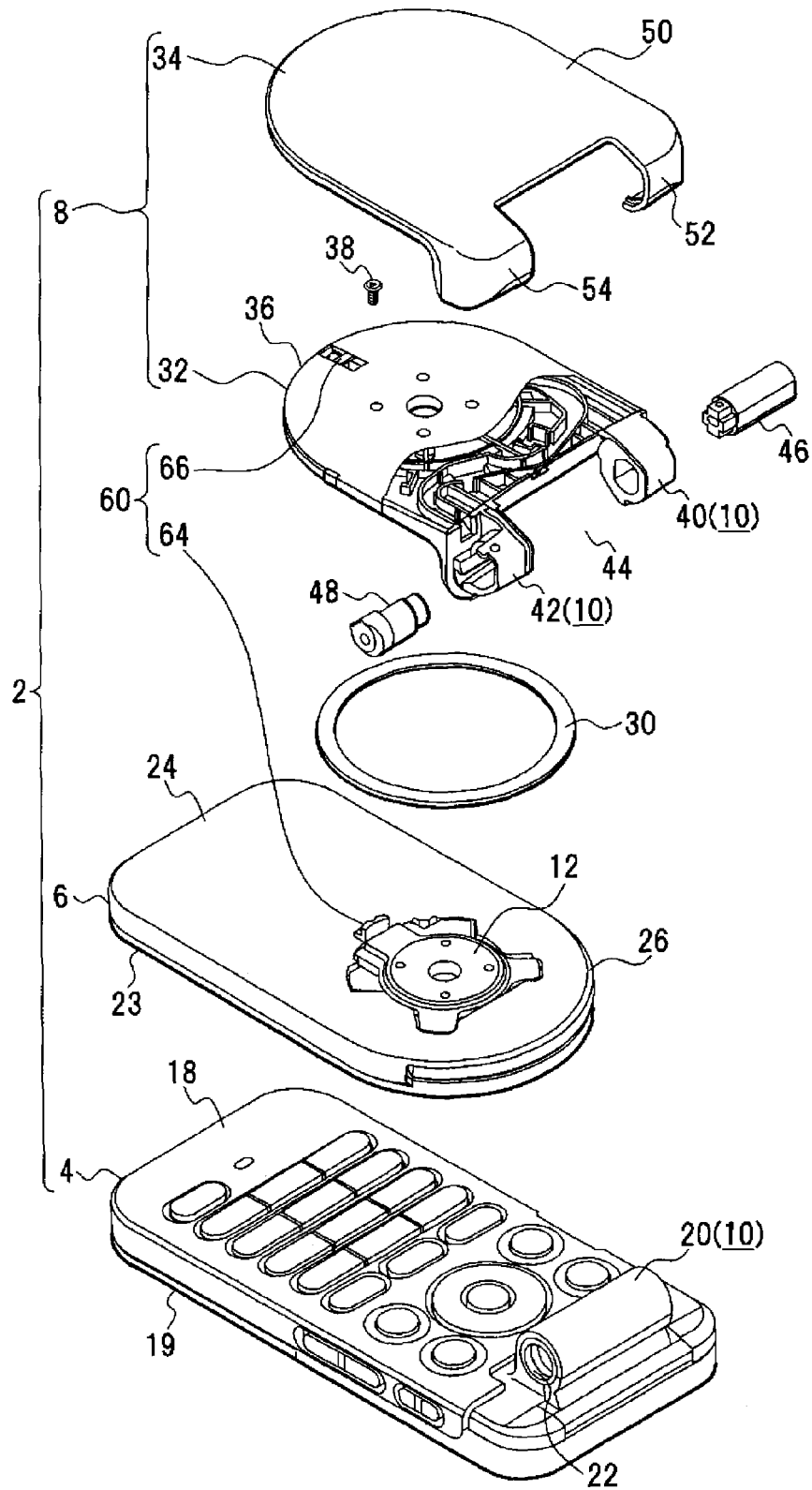
FIG. 7 depicts an exploded perspective view of the portable terminal apparatus.

Description will be given for the portable terminal apparatus 2 and the rotation locking mechanism referring to FIG. 7. FIG. 7 depicts an exploded perspective view of the portable terminal apparatus 2. In FIG. 7, the components same as those in FIGS. 1 to 6 are given the same reference numerals.

The structure and the rotation locking mechanism of the portable terminal apparatus 2 is an example of an electronic apparatus including the movable arm unit 8 as the supporting frame unit, and the rotation locking mechanism. The embodiment shows a configuration according to which the movable housing unit 6 is fitted to the movable arm unit 8 through the rotating module 12 and the movable housing unit 6 is locked at a predetermined angle.

The fixed housing unit 4 includes a fixed front case unit 18 and a fixed rear case unit 19. A bearing unit 20 of the hinging mechanism 10 is formed on the edge of the fixed front case unit 19 in the longitudinal direction thereof. The bearing unit 20 has a bearing hole 22. The fixed rear case unit 19 mounts a fixed-side substrate, etc.

The movable housing unit 6 includes a movable front case unit 23 and a movable rear case unit 24. The rotating module 12 is fitted on the rounded portion 26 of the movable rear case unit 24. A ring-shaped sliding sheet 30 is placed around the rotating module 12. The sliding sheet 30 maintains the lubricity thereof for the sliding face of the movable arm unit 8 and prevents the saccadic movement of the unit 8. The movable front case unit 23 mounts a movable-side substrate, etc.

The movable arm unit 8 includes an arm unit 32 and an arm cover unit 34. The movable rear case unit 24 of the movable housing unit 6, together with the rotating module 12 already described, is fixed by, for example, a plurality of screws 38 as fixing means to a rounded portion 36 of the arm unit 32. Bearing units 40 and 42 of the hinging mechanism 10 are formed on the arm unit 32. The bearing unit 20 of the fixed housing unit 4 is inserted into a space 44 between the bearing units 40 and 42. A hinging module 46 as a hinging shaft reaching the bearing unit 20 of the fixed housing unit 4 is inserted and fixed into/to the bearing unit 40. A hinging module 48 as a hinging shaft is also inserted and fixed into/to the bearing unit 42. The hinging module 48 may be configured as a cable guide to run therethrough cables not shown.

The arm cover unit 34 includes a lid 50 covering the upper face of the arm unit 32 and covering units 52 and 54 covering the bearing units 40 and 42. The lid 50 is connected to the arm unit 32 and protects the upper face of the arm unit 32. The covering portions 52 and 54 respectively cover the circumferential walls of the bearing units 40 and 42 and respectively reinforce and protect the bearing units 40 and 42.

As above, the hinging mechanism 10 consists of the bearing unit 20 of the fixed housing unit 4, the bearing units 40 and 42 of the movable arm unit 8, and the hinging modules 46 and 48 and the movable arm unit 8 are supported on the fixed housing unit 4 being able to be opened and closed (in the embodiment, can be opened and closed at 180 degrees). The rotating module 12 supports rotatably the movable housing unit 6 on the movable arm unit 8.

A rotation locking mechanism 60 that determines the central position of a right/left allowable rotation angle of 90 degrees of the movable housing unit 6, that is, a 0-degree position and a stopper mechanism 62 (FIG. 17) that determines a rotation range of the right/left allowable rotation angle of 90 degrees are installed respectively in the movable arm unit 8 that supports rotatably the movable housing unit 6 through the rotating module 12, and the movable housing unit 6 that is rotatable on the movable arm unit 8 due to the rotating module 12.

In the embodiment, a pin engaging portion 64 of the rotation locking mechanism 60 is integrally formed on the movable rear case unit 24. The pin engaging portion 64 is placed on the inner side of the sliding sheet 30 and on the outer side of the rotating module 12, and is protruded on the upper face of the movable rear case unit 24. A locking pin 66 that engages with the pin engaging portion 64 is fitted to the arm unit 32 of the movable arm unit 8 and is, in the embodiment, installed inside the arm unit 32.

Figure 8:
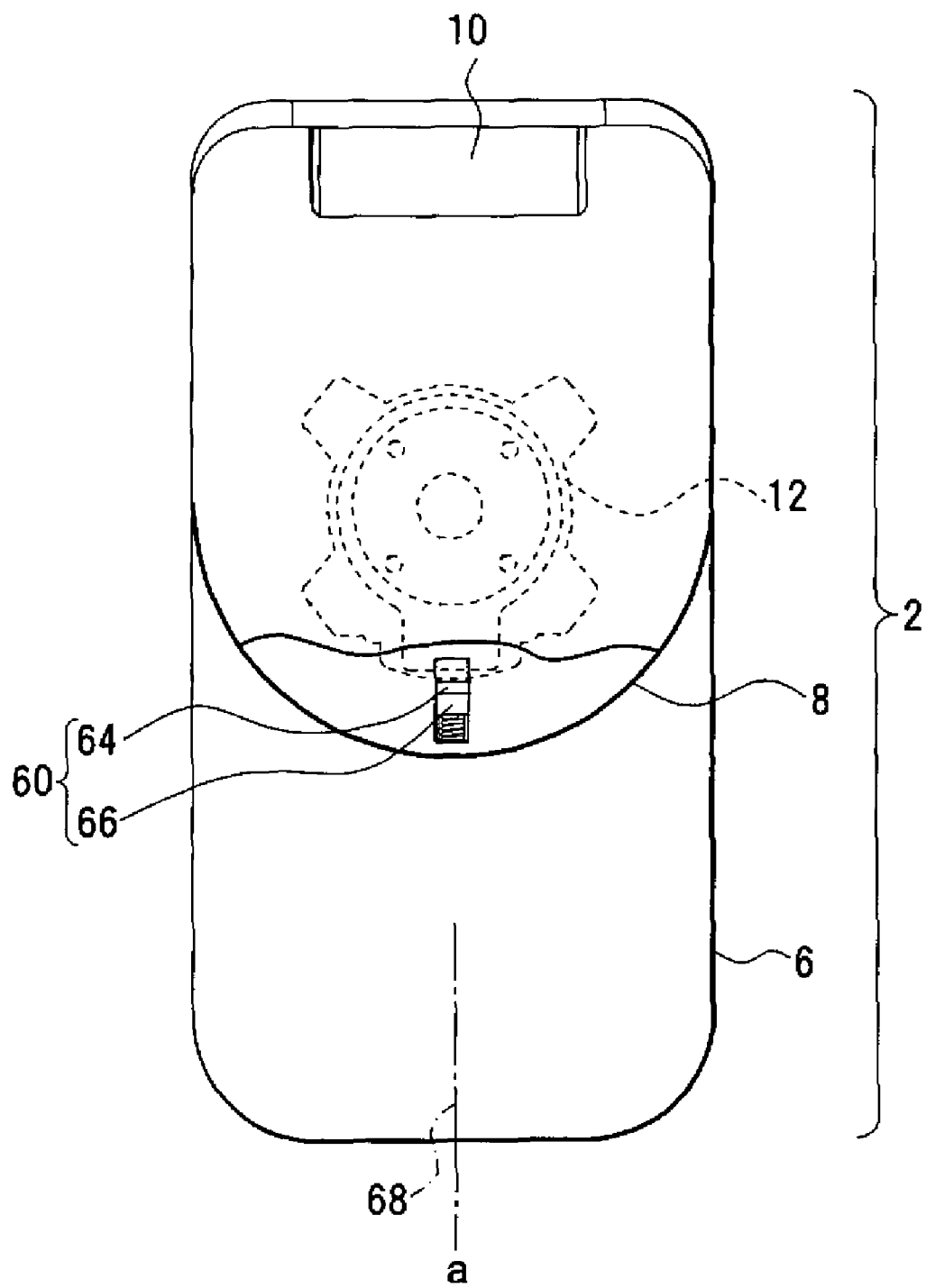
FIG. 8 depicts the position of a rotation locking mechanism of the portable terminal apparatus.
Figure 9:
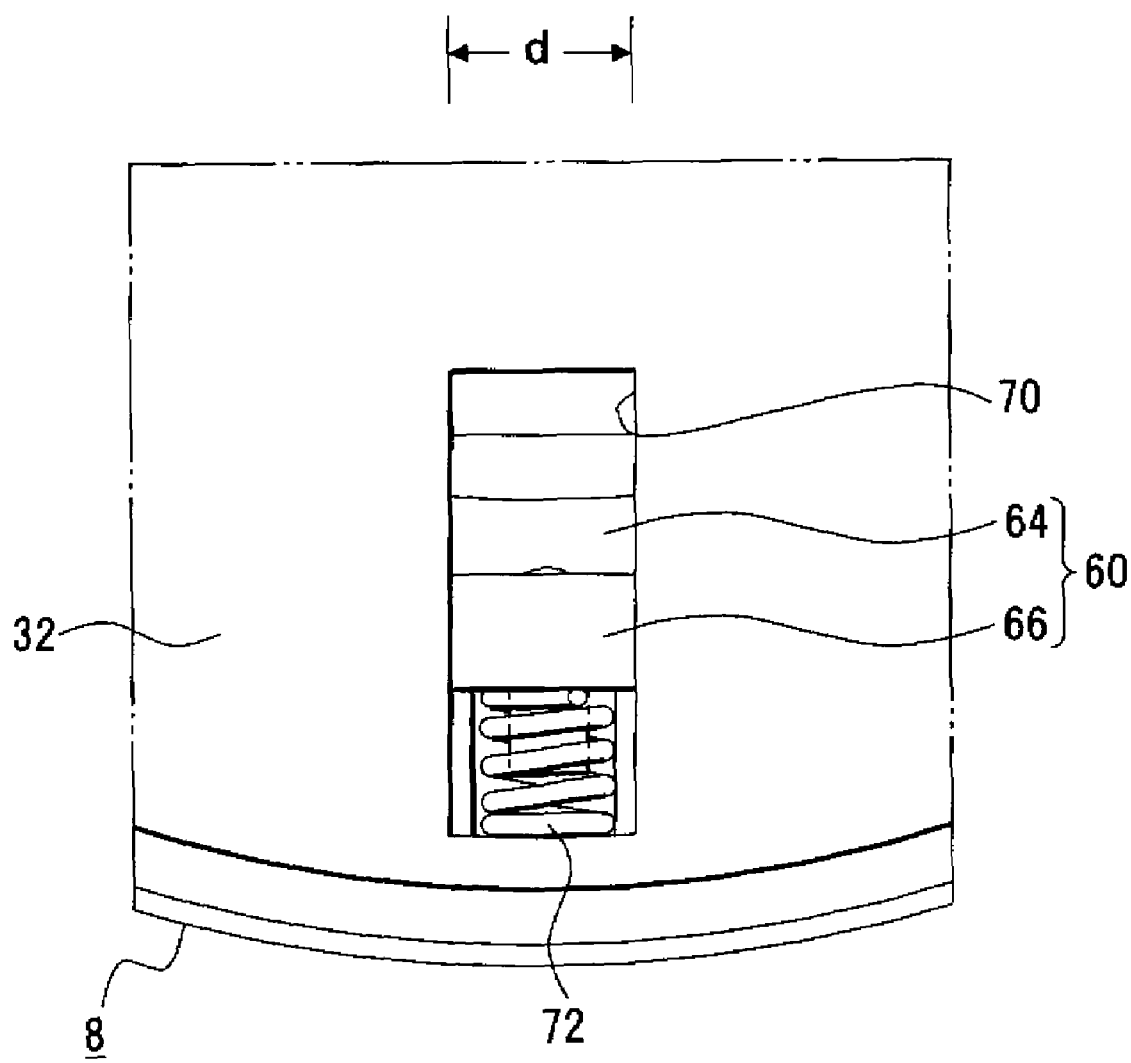
FIG. 9 depicts an enlarged view of the rotation locking mechanism seen from a movable arm unit.
Figure 10:
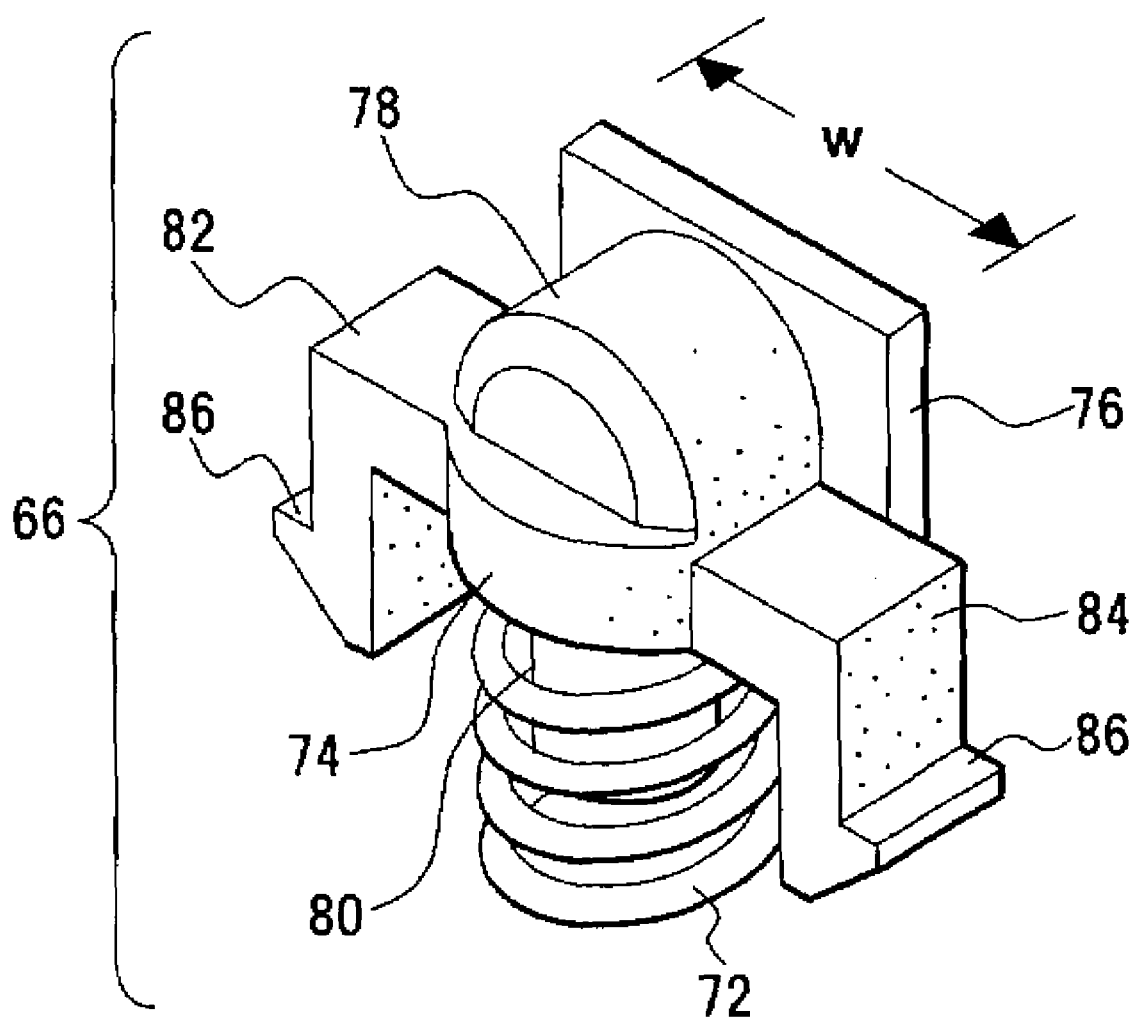
FIG. 10 depicts a perspective view of a locking pin taken out of the apparatus.
Figure 11:
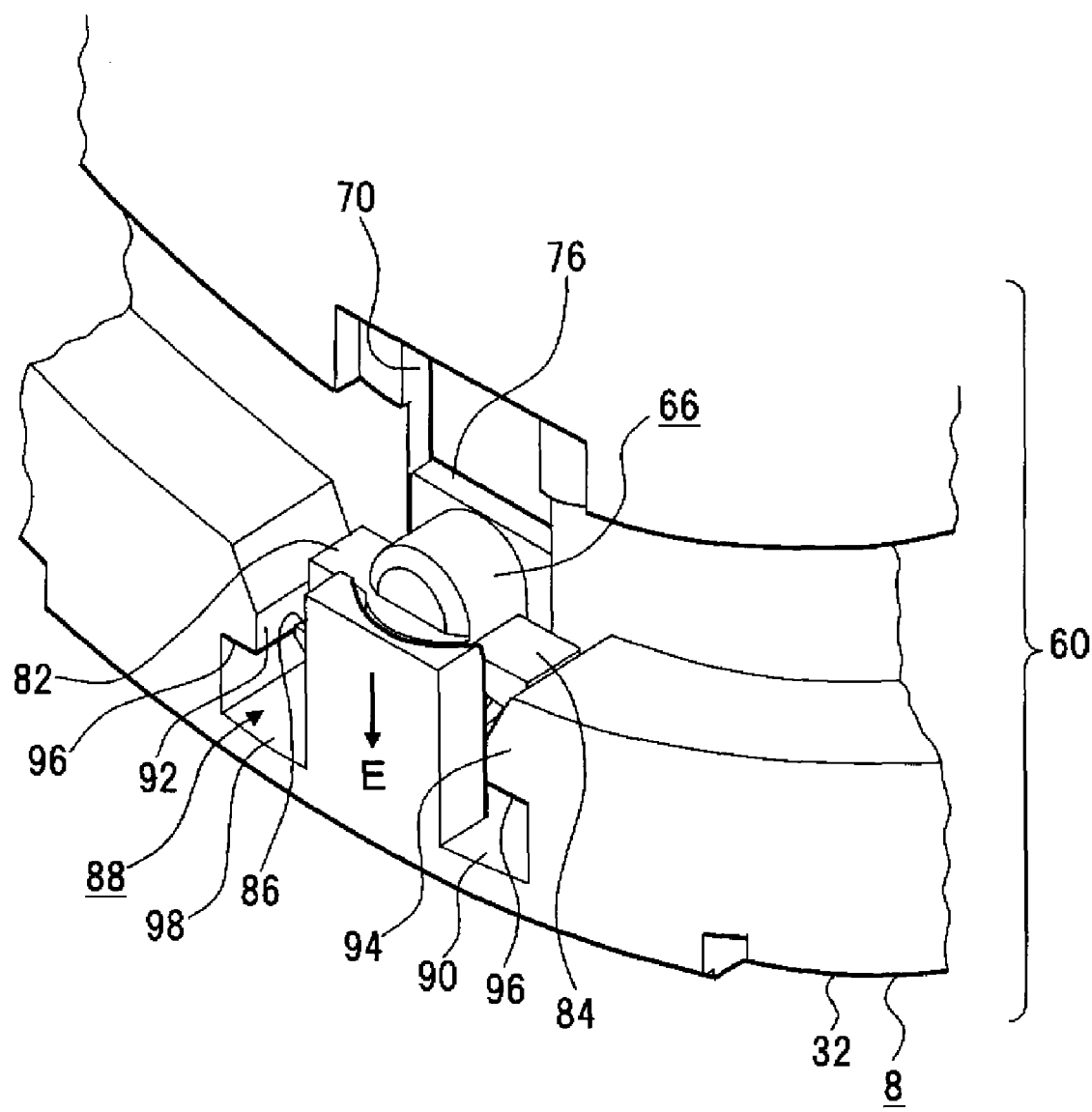
FIG. 11 depicts an enlarged perspective view of a locking pin portion of the movable arm unit.
Figure 12:
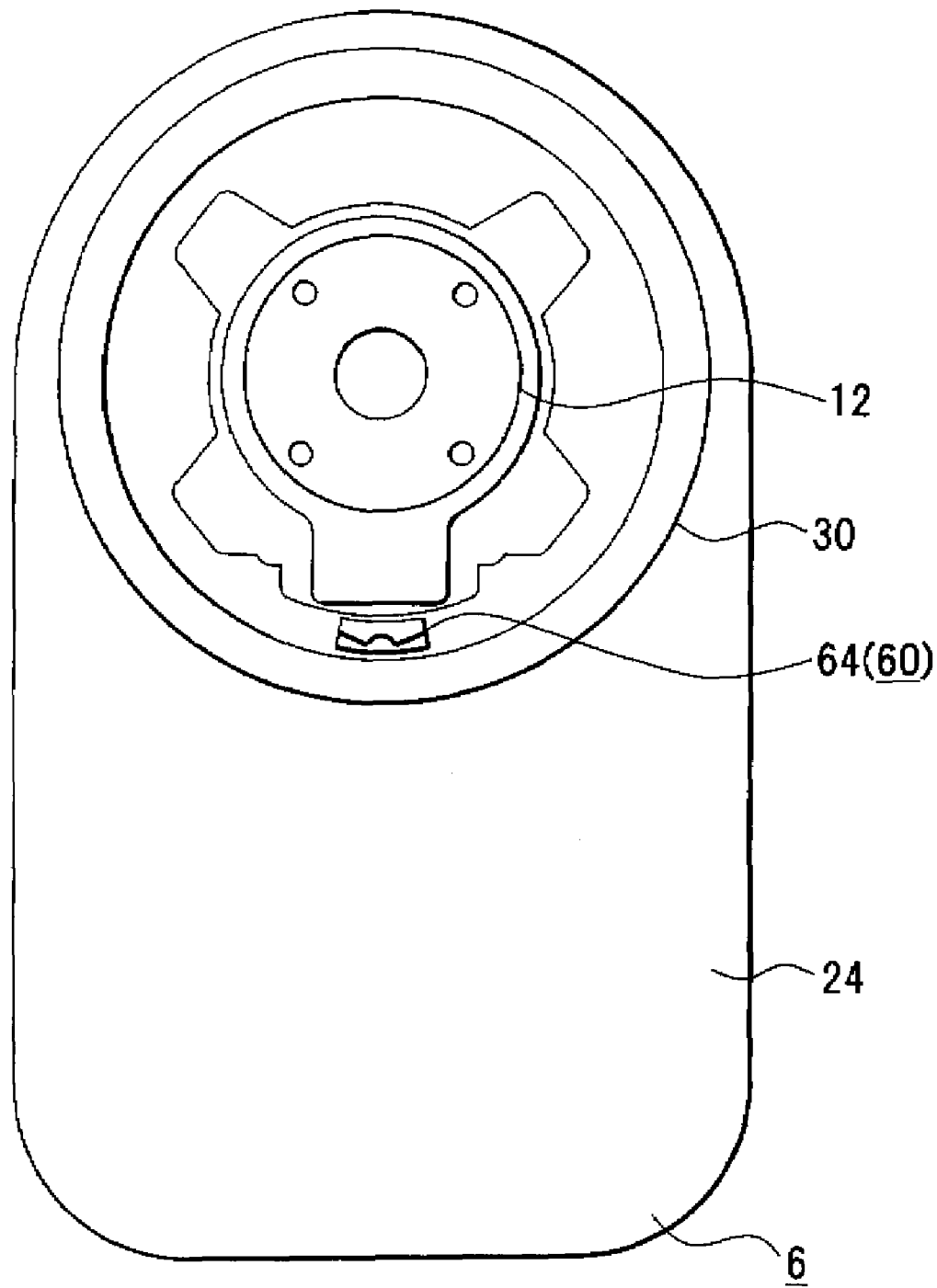
FIG. 12 depicts the positional relation of a rotating module and a pin engaging portion.
Figure 13:
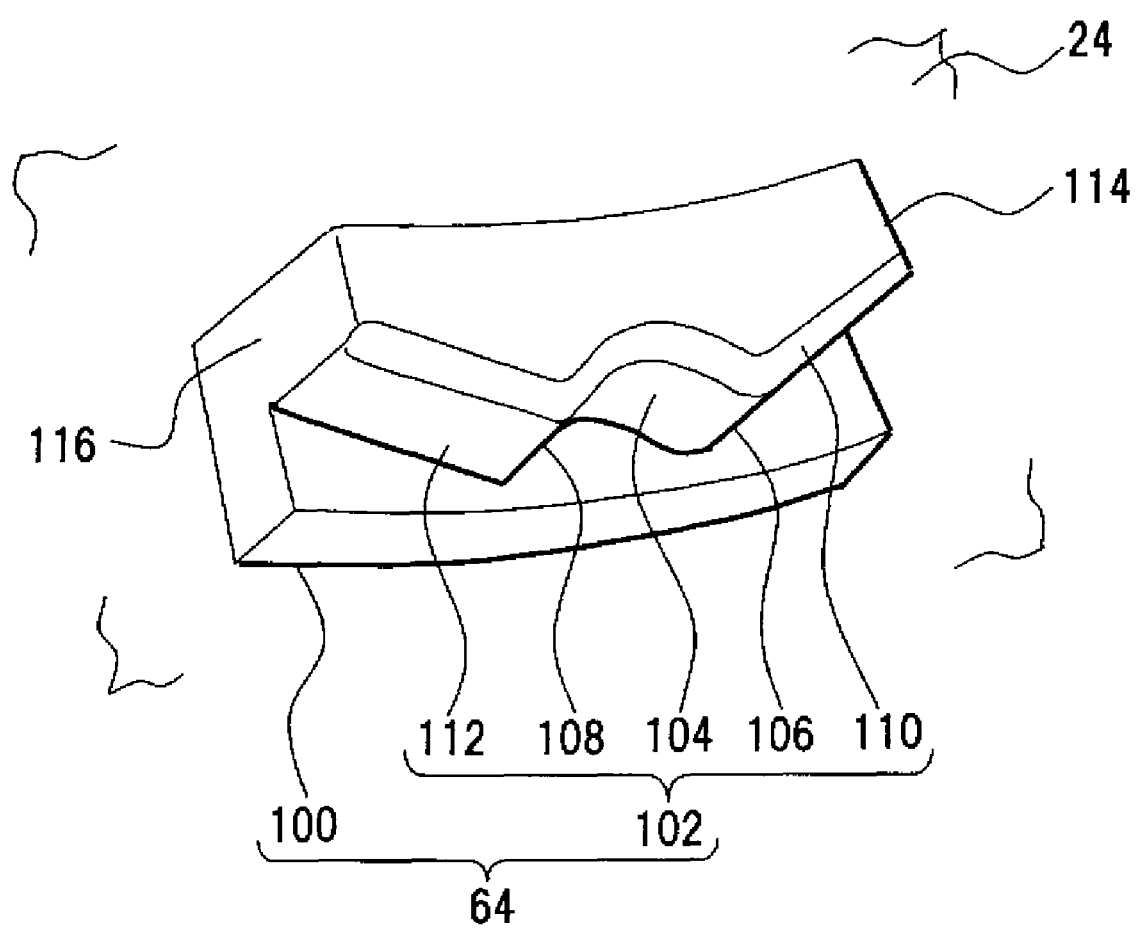
FIG. 13 depicts the pin engaging portion.
Figure 14:
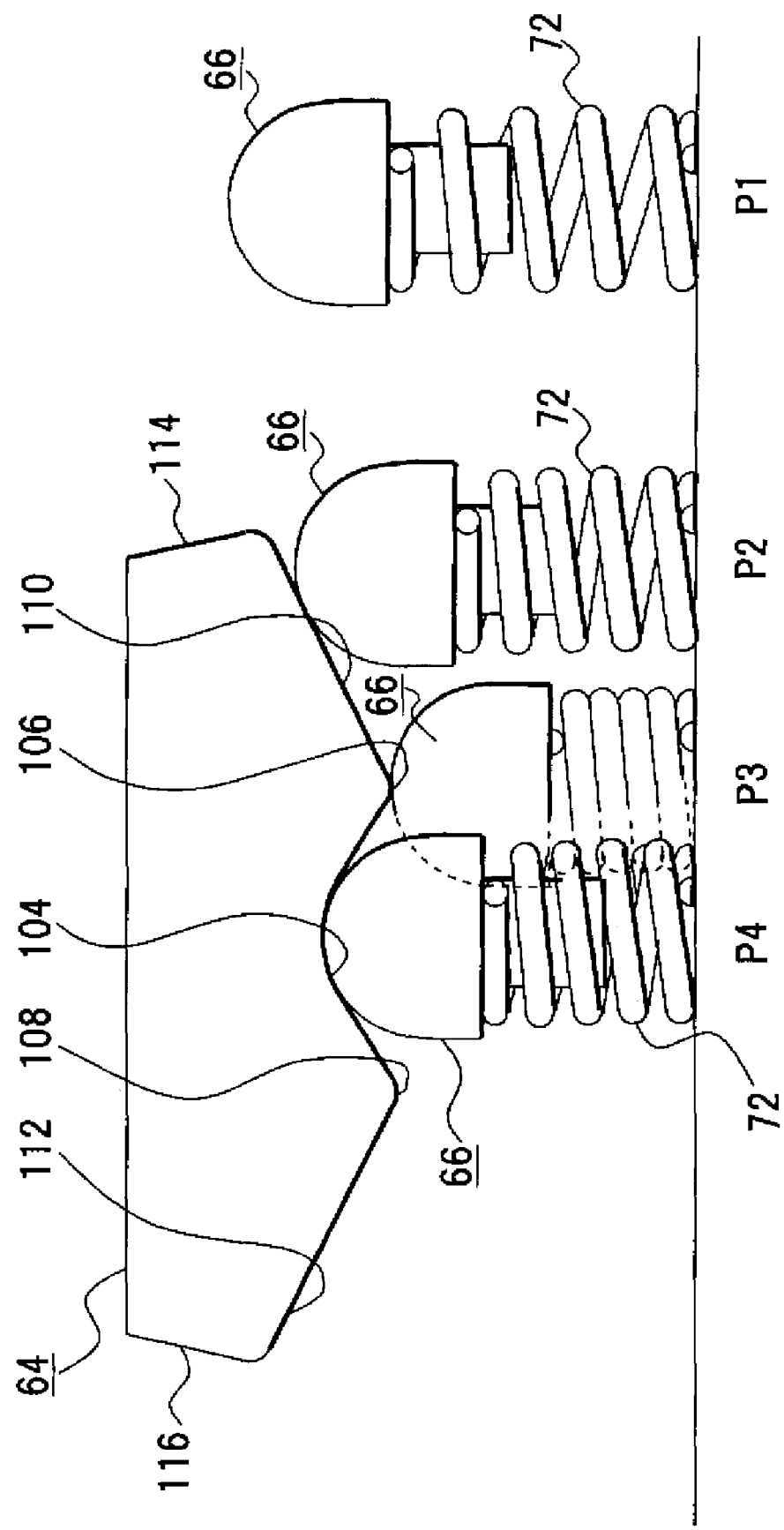
FIG. 14 depicts a rotation locking operation.
Figure 15:
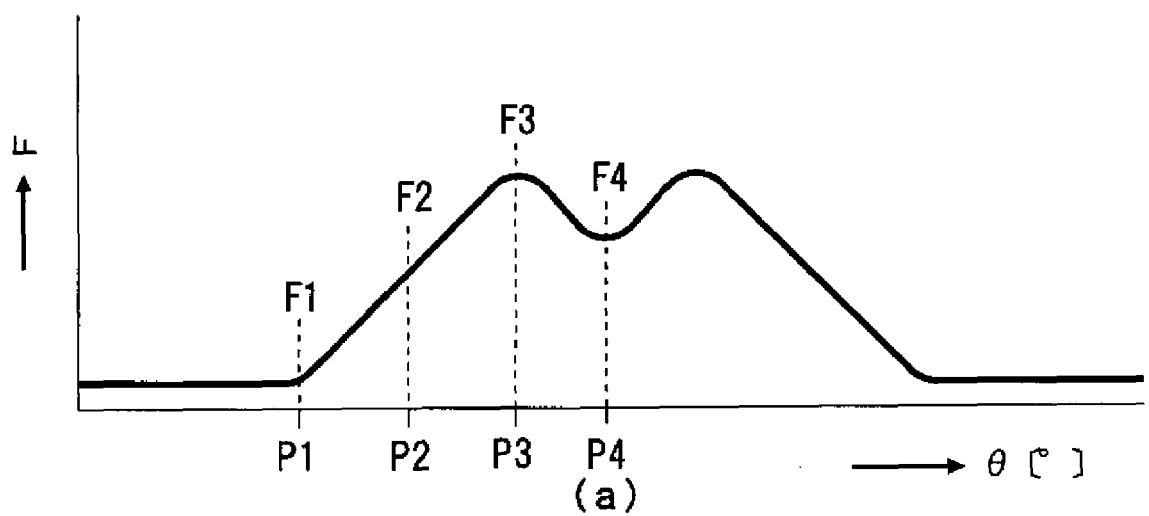
FIG. 15 depicts an angle and variation of a load of the movable housing unit in the rotation locking mechanism.

Detailed description will be given for the rotation locking mechanism 60 referring to FIGS. 8 to 15. FIG. 8 depicts the position of the rotation locking mechanism 60 of the portable terminal apparatus. FIG. 9 depicts an enlarged view of the rotation locking mechanism 60 seen from the movable arm unit 8. FIG. 10 depicts a perspective view of the locking pin taken out of the apparatus. FIG. 11 depicts an enlarged perspective view of a locking pin portion of the movable arm unit 8. FIG. 12 depicts the positional relation of the rotating module and the pin engaging portion. FIG. 13 depicts the pin engaging portion (the stopper portion of the stopper mechanism). FIG. 14 depicts a rotation locking operation. FIG. 15 depicts an angle and variation of a load of the movable housing unit 6 in the rotation locking mechanism. In FIGS. 8 to 14, the components same as those in FIGS. 1 to 7 are given the same reference numerals.

As shown in FIG. 8, the rotation locking mechanism 60 is a mechanism to fix and hold the movable housing unit 6 that is supported rotatably on the movable arm unit 8 through the rotating module 12, at a position that coincides with the fixed housing unit 4, that is, the central fixing position "a". The fixing and holding of the movable housing unit 6 at the position of the movable arm unit 8 cause a user to recognize that the position is the reference position, form a holding state as strong as a state where the movable housing unit 6 is not moved unless the user applies a force to the right or left intending to rotate the unit 6, do not assume any locked state where no move is allowed, and assume holding as strong as the holding that does not allow the unit 6 to be rotated by a load for an ordinary rotating operation, or by an opening operation or a closing operation.

In the embodiment, to fix and hold the movable housing unit 6 at a position that coincides with the fixed housing unit 4, that is, the central fixing position a, the rotation locking mechanism 60 is installed on a virtual central axis 68 penetrating the center of the rotation of the rotating module 12 fixed to the movable arm unit 8. Considering that the movable housing unit 6 is fixed at the central fixing position a, it is not necessary to install the rotation locking mechanism 60 on the central axis 68. However, because the pin engaging portion 64 of the rotation locking mechanism 60 is shared by the stopper mechanism 62 and the stopper mechanism 62 prevents the rotation at a rotation angle that is same for both of the right side and the left side (in the embodiment, 90 degrees), the rotation locking mechanism 60 is installed on the central axis 68.

As shown in FIG. 9, a guiding hole 70 having a rectangular shape that has the long sides in the direction on the central axis of the rotating module 12 is formed on the arm unit 32 of the movable arm unit 8. The locking pin 66 is installed in the guiding hole 70 slidably in the direction of the central axis of the rotating module 12 and a coil spring 72 is installed as an elastic unit between the locking pin 66 and the arm unit 32. That is, the locking pin 66 can be moved in the direction on the central axis of the rotating module 12 by receiving a restoring force of the coil spring 72.

As shown in FIG. 10, the locking pin 66 includes a sliding portion 76 having a rectangular shape that is inserted slidably into the above-described guiding hole 70 on the rear face of the pin main body portion 74. A pin tip 78 consisting of an arcuate protrusion having an almost same height of the summit of the sliding portion 76 is formed on the pin main body portion 74 on the central axis thereof. A guiding axis 80 is formed on the central axis of the pin main body portion 74. The coil spring 72 is attached to the guiding axis 80. With the pin tip 78 as the center, arm portions 82 and 84 are respectively formed on both sides of the pin main body portion 74. Each of the arm portions 82 and 84 is, for example, L-shaped and the lower end thereof has a stopper portion 86 protruded in the lateral direction. This locking pin 66 is, for example, integrally formed using a synthetic resin.

In the locking pin 66, because the width w of the sliding portion 76 is designed to be slightly smaller than the width d (>w) of the guiding hole 70, the sliding portion 76 is guided into the guiding hole 70 and, therefore, the locking pin 66 can be moved along the guiding hole 70 and moves in response to the restoring force of the coil spring 72 exerted on the locking pin 66 and contacts with the pin engaging portion 64.

As shown in FIG. 11, the locking pin 66 is installed slidably inside the movable arm unit 8. Describing in detail a sliding mechanism 88 that slides the locking pin 66, a sliding groove 90 that slides the locking pin 66 is formed together with the guiding hole 70 in the arm unit 32 of the movable arm unit 8. Guiding grooves 92 and 94 corresponding to the arm portions 82 and 84 are formed in the sliding groove 90. A stopper portion 96 that defines the upward moving range of the locking pin 66 is formed on the ceiling of the guiding grooves 92 and 94, corresponding to the stopper portion 86. The coil spring 72 fitted to the guiding shaft 80 of the locking pin 66 is bound between the pin main body portion 74 of the locking pin 66 and a bottom portion 98 of the arm unit 32. That is, when the locking pin 66 moves in the direction indicated by an arrow E in FIG. 11, that is, when engagement of the locking pin 66 with the pin engaging portion 64 is started, the coil spring 72 is compressed and the restoring force of the coil spring 72 exerts strongly on the locking pin 66. The restoring force is used for a holding force that blocks the rotation of the rotation locking mechanism 60.

As shown in FIG. 12, the pin engaging portion 64 that engages with the locking pin 66 is installed protruded on the central axis of the movable rear case unit 24 of the movable housing unit 6 and, in the embodiment, is installed at a position sufficiently separated from the center of the rotation of the rotating module 12 and at a portion inside the sliding sheet 30 that surrounds the rotating module 12.

As shown in FIG. 13, the pin engaging portion 64 is a protruded portion formed integrally with the movable rear case unit 24 and includes a base portion 100 and a pin contacting portion 102. The base portion 100 is arcuate and is designed to be larger than the vertically projected area of the pin contacting portion 102. A recessed portion 104 forming an arcuate dent into which the locking pin 66 is inserted at the center is formed on the pin contacting portion 102. Arcuate protrusions 106 and 108 and slope portions 110 and 112 respectively sandwiching the recessed portion 104 are formed at positions recessed from the front edge of the base portion 100. The recessed portion 104, the protrusions 106 and 108, and the slope portions 110 and 112 of the pin contacting portion 102 are formed and disposed symmetrically to the central axis. The reason of this symmetry is to rotate the movable housing unit 6 for 90 degrees to the right or to the left on both sides of the central axis and obtain a locked state and operability at the center of the rotation.

As a result of including such a rotation locking mechanism 60, at the position at which the positions of the movable housing unit 6 and the fixed housing unit 4 coincide with each other, the locking pin 66 is engaged in the recessed portion 104 of the pin engaging portion 64 and the restoring force is exerted from the coil spring 72 that is compressed. Therefore, a locked state is established by the load corresponding to the restoring force of the coil spring 72. In this case, when a force is applied to the movable housing unit 6 in the direction of a rotation, the locking pin 66 contacts the protrusions 106 and 108 of the pin engaging portion 64 and, therefore, the compression of the coil spring 72 becomes tighter. Therefore, a strong restoring force is exerted from the coil spring 72 and the load between the pin engaging portion 64 and the locking pin 66 is increased. As a result, the locked state is maintained because the rotation of the movable housing unit 6 can not be realized unless a force for rotation stronger than this load is exerted.

When the movable housing unit 6 is rotated and is moved to the central position of the fixed housing unit 4, as shown in FIG. 14, the relative positions of the locking pin 66 and the pin engaging portion 64 are varied and, at a position P1 at which the locking pin 66 is disengaged from the pin engaging portion 64, the coil spring 72 is in a released state. In contrast, at a position P2 at which the locking pin 66 contacts the slope portion 110 of the pin engaging portion 64, the compressed state of the coil spring 72 becomes tighter corresponding to the slope of the slope portion 110 and, at a position P3 at which the locking pin 66 reaches the protrusion 106 of the pin engaging portion 64, the compressed condition of the coil spring 72 becomes tightest. At a position P4 at which the locking pin 66 is engaged in the recessed portion 104 of the pin engaging portion 64, though the compressed state of the coil spring 72 is loosened compared with that for the position P3, a compressed state tighter than the released state for the position P1 is maintained.

As a result, corresponding to the rotated position of the movable housing unit 6, the load due to the restoring force of the coil spring 72 is varied corresponding to the shape of the locking pin 66 of the pin engaging portion 64. As a result, as shown in FIG. 15, a load F exerted on the movable housing unit 6 is varied corresponding to the rotation angle θ [°] of the movable housing unit 6. Therefore, the variation of the torque and the locked state are formed. In FIG. 15, P4 indicates the central position. Representing the loads of the positions P1, P2, P3, and P4 as respectively F1 (=0), F2, F3, and F4, F3>F4≧F2>F1.

Figure 16:
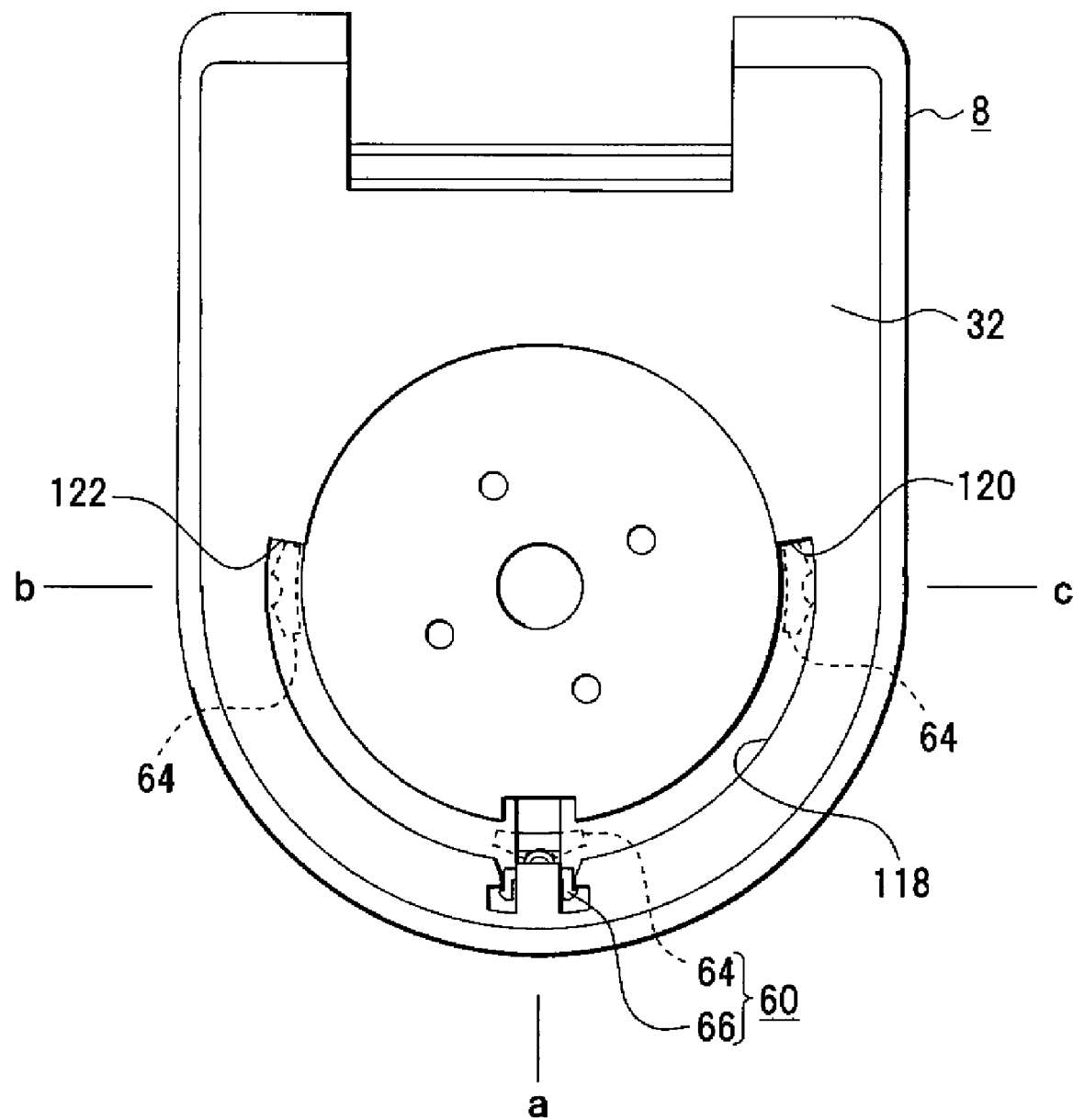
FIG. 16 depicts a rear view of the movable arm unit.
Figure 17:
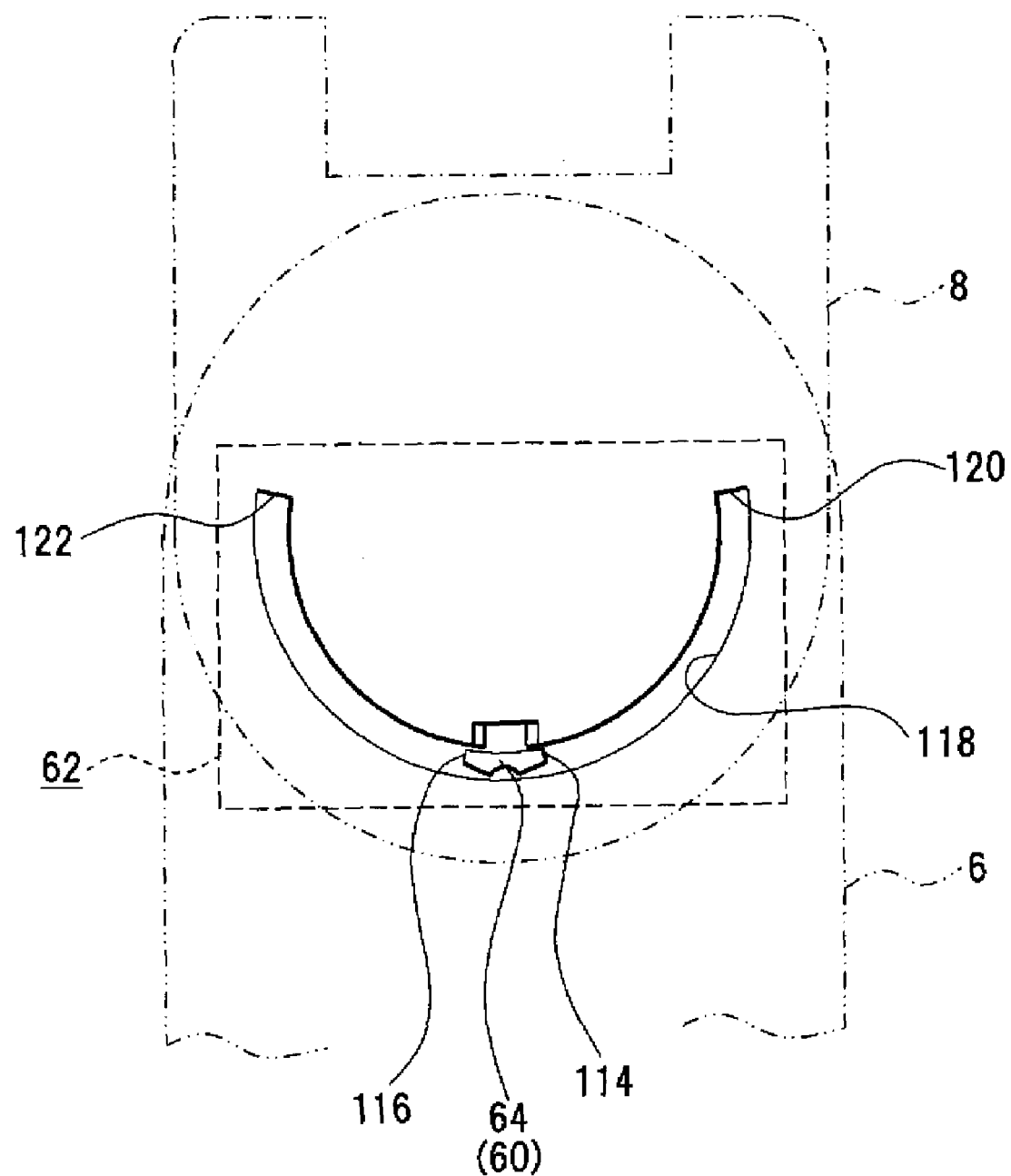
FIG. 17 depicts a stopper mechanism and an operation thereof.
Figure 18:
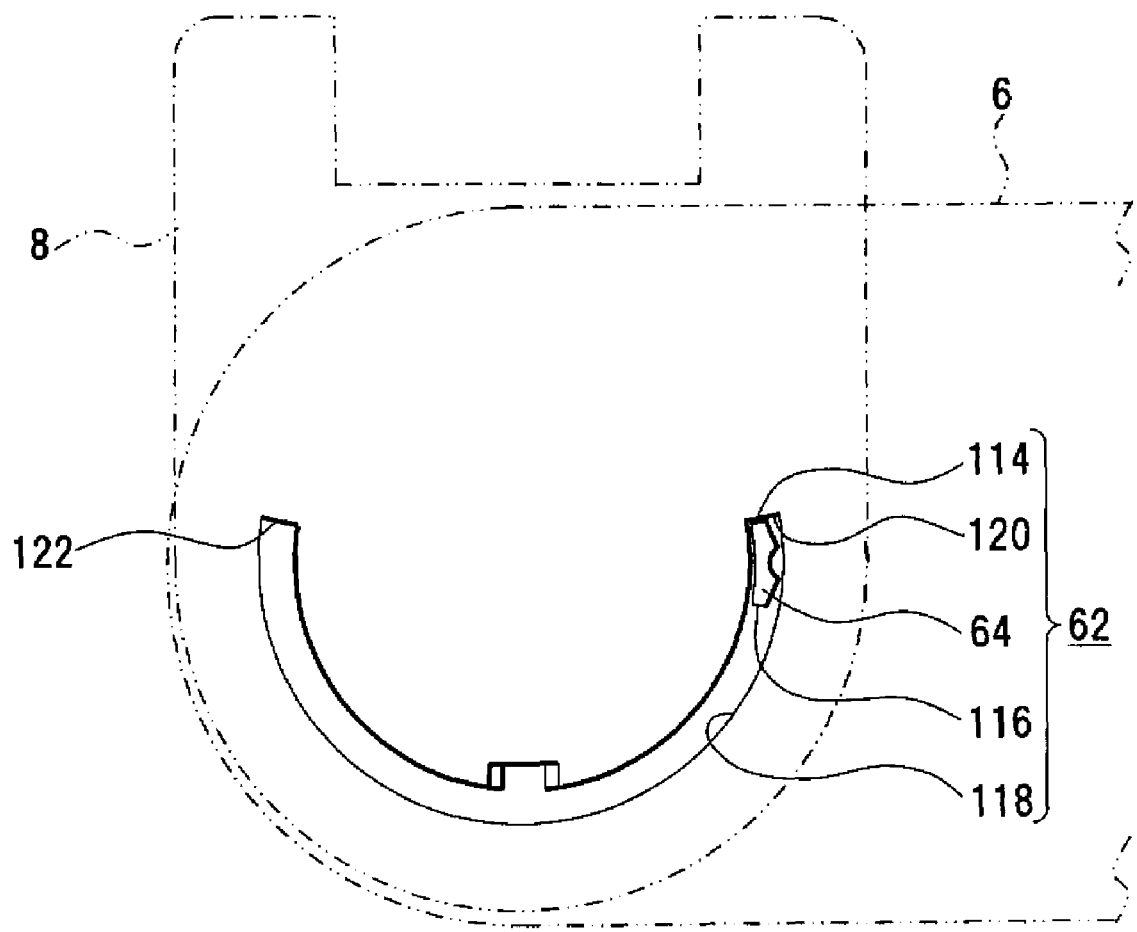
FIG. 18 depicts the stopper mechanism and an operation thereof.
Figure 19:
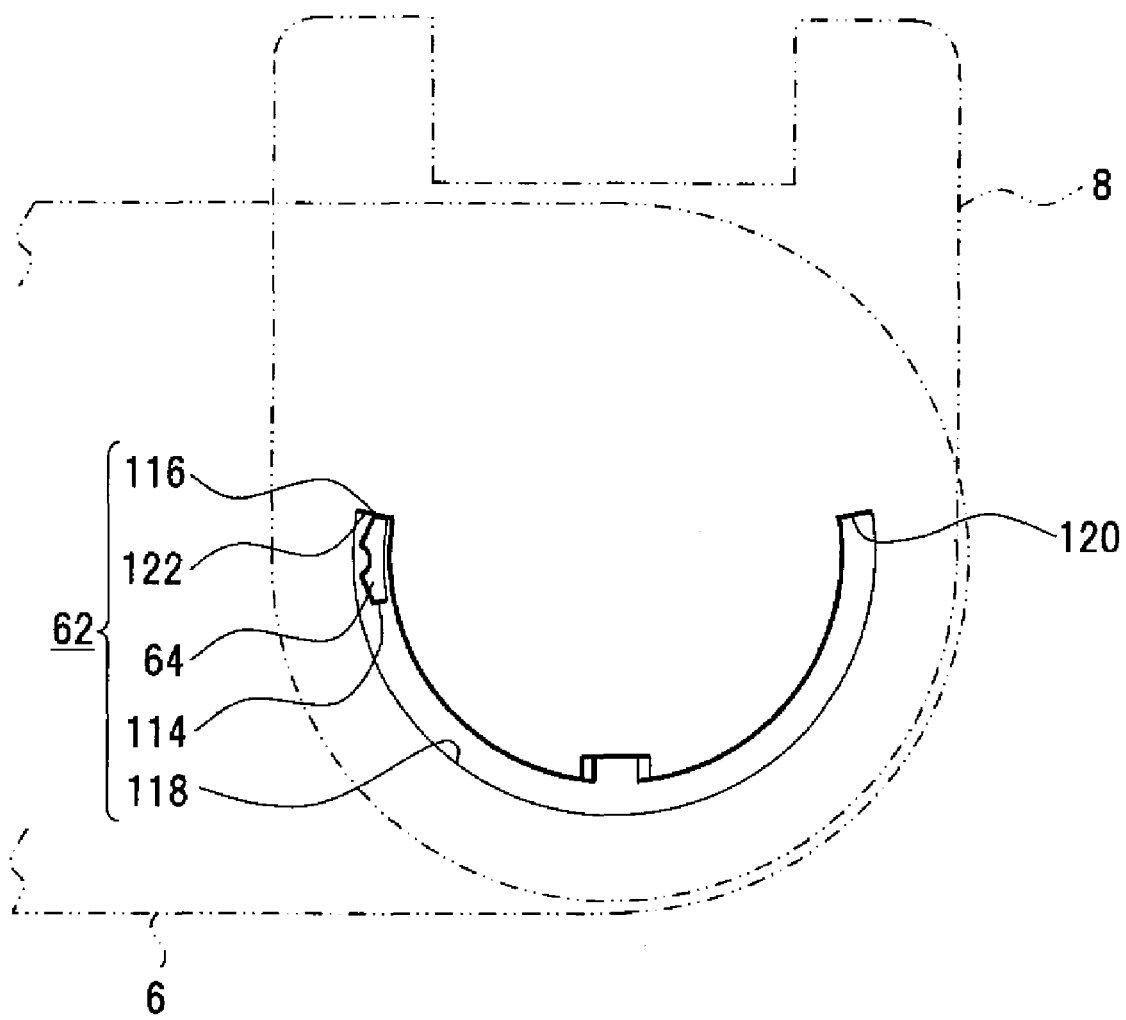
FIG. 19 depicts the stopper mechanism and an operation thereof.

Detailed description will be given for the stopper mechanism 62 referring to FIGS. 16 to 19. FIG. 16 depicts a rear view of the movable arm unit. FIGS. 17, 18 and 19 depict the stopper mechanism and an operation thereof. In FIGS. 16 to 19, the components same as those in FIGS. 1 to 14 are given the same reference numerals.

The stopper mechanism 62 is adapted to set the maximal rotation angle of the (counter) clockwise rotation of the movable housing unit 6 with the rotation locking mechanism 60 at the center and to stop the movable housing unit 6 at the maximal rotation angle.

In the embodiment, the pin engaging portion 64 is shared by the stopper portion and stopper faces 114 and 116 are formed on the pin engaging portion 64 (FIGS. 13 and 14).

As shown in FIG. 16, corresponding to the pin engaging portion 64 (stopper portion), an arcuate grooved portion 118 into which the pin engaging portion 64 is inserted, and stoppers 120 and 122 that contact the stopper faces 114 and 116 of the pin engaging portion 64 at the end of the grooved portion 118 are formed on the movable arm unit 8. More specifically, the stopper faces 114 and 116 respectively impinge on the stoppers 120 and 122 and the rotation of the movable housing unit 6 is blocked. The position at which the rotation is blocked is the position b or c that is 90 degrees away from the central fixing position a.

According to the above configuration, when the movable housing unit 6 being present at a position as shown in FIG. 17 is rotated counterclockwise, as shown in FIG. 18, the stopper face 114 of the pin engaging portion 64 impinges the stopper 120 that is an end of the grooved portion 118 and the movable housing unit 6 stops at an angular position of 90 degrees counterclockwise (on the observers' right). When the movable housing unit 6 being present at a position as shown in FIG. 17 is rotated clockwise, as shown in FIG. 19, the stopper face 116 of the pin engaging portion 64 impinges the stopper 122 that is another end of the grooved portion 118 and the movable housing unit 6 stops at an angular position of 90 degrees clockwise (on the observers' left).

Concerning the above embodiment, description will be given for advantages, effects, etc., thereof extracting the features thereof.

The portable terminal apparatus 2 includes the function for folding by opening and closing thereof, and the rotation operation and the rotation locking at predetermined positions of the movable housing unit 6, configured by fitting the movable arm unit 8 enabling the unit 8 to be opened and closed to the fixed housing unit 4 and fitting the movable housing unit 6 rotatably to the movable arm unit 8.

The rotation locking mechanism 60 exerts the load to maintain the recess-and-protrusion engagement of the locking pin 66 and the pin engaging portion 64 and to cause the recess-and-protrusion engagement to maintain the locked state thereof using the restoring force of the elasticity of the coil spring 72. Though such a configuration is a very simple structure, the configuration can fix and maintain the engagement at predetermined rotation angles and improvement of the fixation precision can be facilitated. When a force for rotation stronger than the load caused by the coil spring 72 is exerted, the movable housing unit 6 can be rotated to predetermined angles and the portable terminal apparatus 2 having high operability can be configured.

The movable housing unit 6 configures a displaying unit component and the rotation operation angle is wide that is 90 degrees to the right and left (an operation range of 180 degrees), and the unit 6 can be held in a folded state thereof (0 degree) and the rotation operation thereof is possible even in the folded state. Therefore, the movable housing unit 6 can be operated to a desired angle.

Because the pin engaging portion 64 of the rotation locking mechanism 60 configures the stopper of the stopper mechanism 62, setting of angles for the case where the portion 64 and the stopper are separately configured, etc. is not necessary and this contributes reduction of the number of parts. That is, when the width of the pin engaging portion 64 in the rotation direction is determined, the movable housing unit 6 can be set with high precision at the positions at the maximal rotation angle, for example, at 90 degrees on the right and left only by setting the circumferential length of the grooved portion 118. Therefore, the precision of the positions of the displaying unit component can be improved.

In the rotation locking mechanism 60, a load that differs according to the rotation angle can be obtained by the contact of the pin contacting portion 102 of the pin engaging portion 64 and the locking pin 66. As a result, the rotation torque and the locked state can be obtained.

In the above embodiment, the rotating module 12 is a retracting cam structure that causes the rotating module 12 to retract into a position of the maximal angle and causes the two housings to press each other and, therefore, contributes to improvement of the precision of the 90 degrees (the maximal angle) on both sides and improvement of the operability.

Because the direction of the engagement of the pin engaging portion 64 and the locking pin 66 is set in the radial direction of the movable arm unit 8 and the engagement is received inside the arm unit 32, compared to the case where the engagement is set in the vertical direction, the thickness of the arm unit 32 can be reduced and this contributes to making the portable terminal apparatus 2 more flat and thinner.

Because the region to be pressed by the locking pin 66 (the width of the rear case unit protrusion) is reduced, reduction of rotation load (reduction of the force necessary for operation) and prevention of friction of the locking pin 66 can be facilitated.

Because the rotation locking mechanism 60 locks the movable housing unit 6 at a position away from the center of the rotation of the rotating module 12 and the center of the rotation of the movable housing unit 6, the precision of the locking of the movable housing unit 6 is high. Therefore, the saccadic movement of the rotating portion can be prevented and a stable locking state can be maintained.

As above, the portable terminal apparatus 2 has high rotation operability, can prevent the gap between the fixed housing unit 4 and the movable housing unit 6 (the displaying unit component) in the closed state and inclination of the displayed screen in the opened state, etc., and contributes to providing a high quality product.

Second Embodiment

Figure 20:
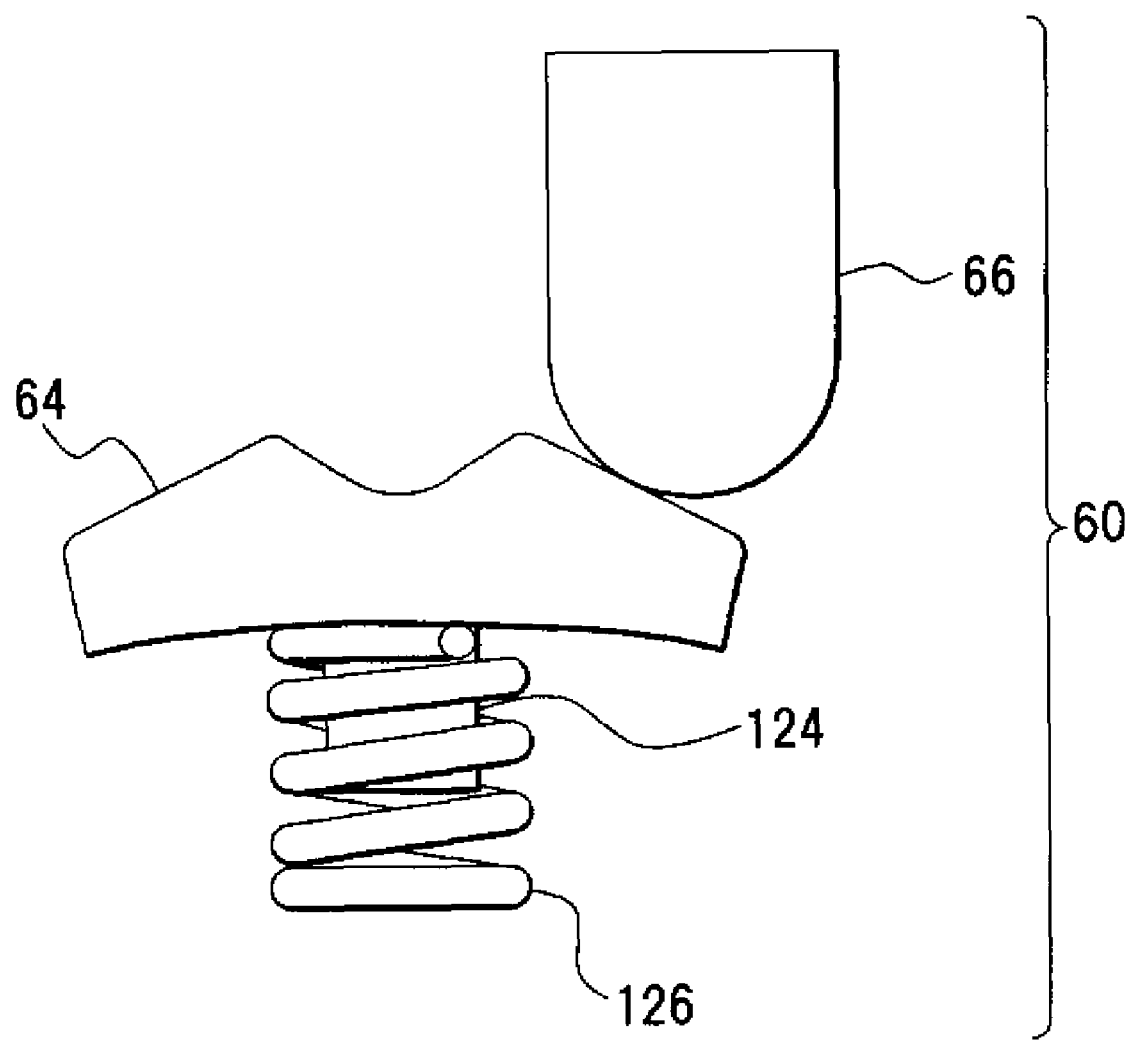
FIG. 20 depicts a rotation locking mechanism according to a second embodiment.
Figure 21:
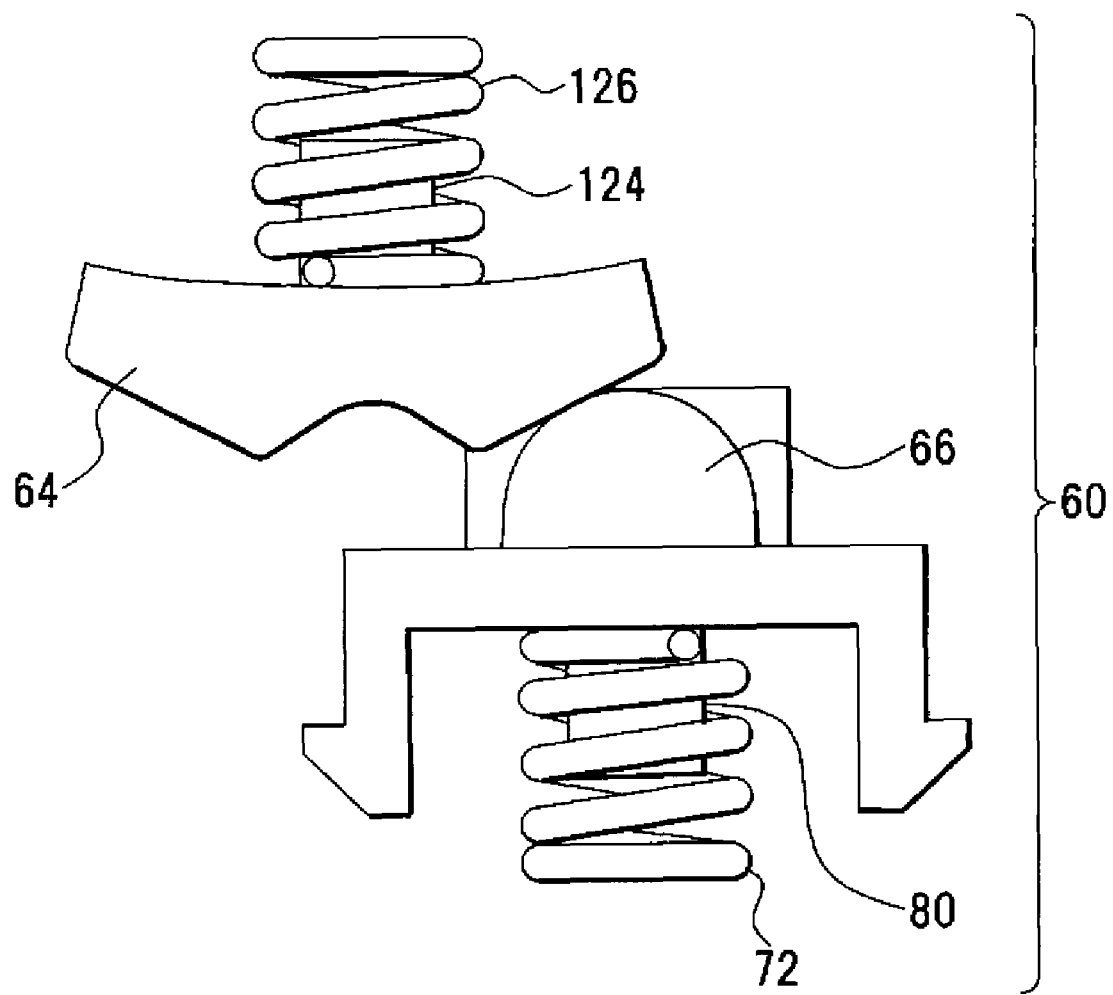
FIG. 21 depicts a modification of the rotation locking mechanism.

Description will be given for a second embodiment of the present invention referring to FIGS. 20 and 21. FIG. 20 depicts a rotation locking mechanism. FIG. 21 depicts a modification of the rotation locking mechanism. In FIGS. 20 and 21, the components same as those in FIGS. 1 to 19 are given the same reference numerals.

Though the rotation locking mechanism 60 is adapted such that the locking pin 66 is movable by the restoring force of the coil spring 72 in the first embodiment, the locking pin 66 may be fixed to the movable housing unit 6. When the mechanism 60 is adapted such that the pin engaging portion 64 can be moved forward and backward by a coil spring as shown in FIG. 20, the same effect can be expected. In this case, a guiding shaft 124 is formed on the pin engaging portion 64 and a coil spring 126 is fitted with the guiding shaft 124.

According to the above configuration, by the engagement of the locking pin 66 installed in the movable housing unit 6 and the pin engaging portion 64 of the movable arm unit 8, the movable housing unit 6 can be locked at a rotation angle for the position of the engagement.

According to the first embodiment, the coil spring 72 is fitted only to the locking pin 66 side. However, as shown in FIG. 21, a rigid locking state can be maintained by fitting the coil springs 72 and 126 with both of the locking pin 66 and the pin engaging portion 64 and establishing engaging relation by the restoring force of the springs.

Figure 22:
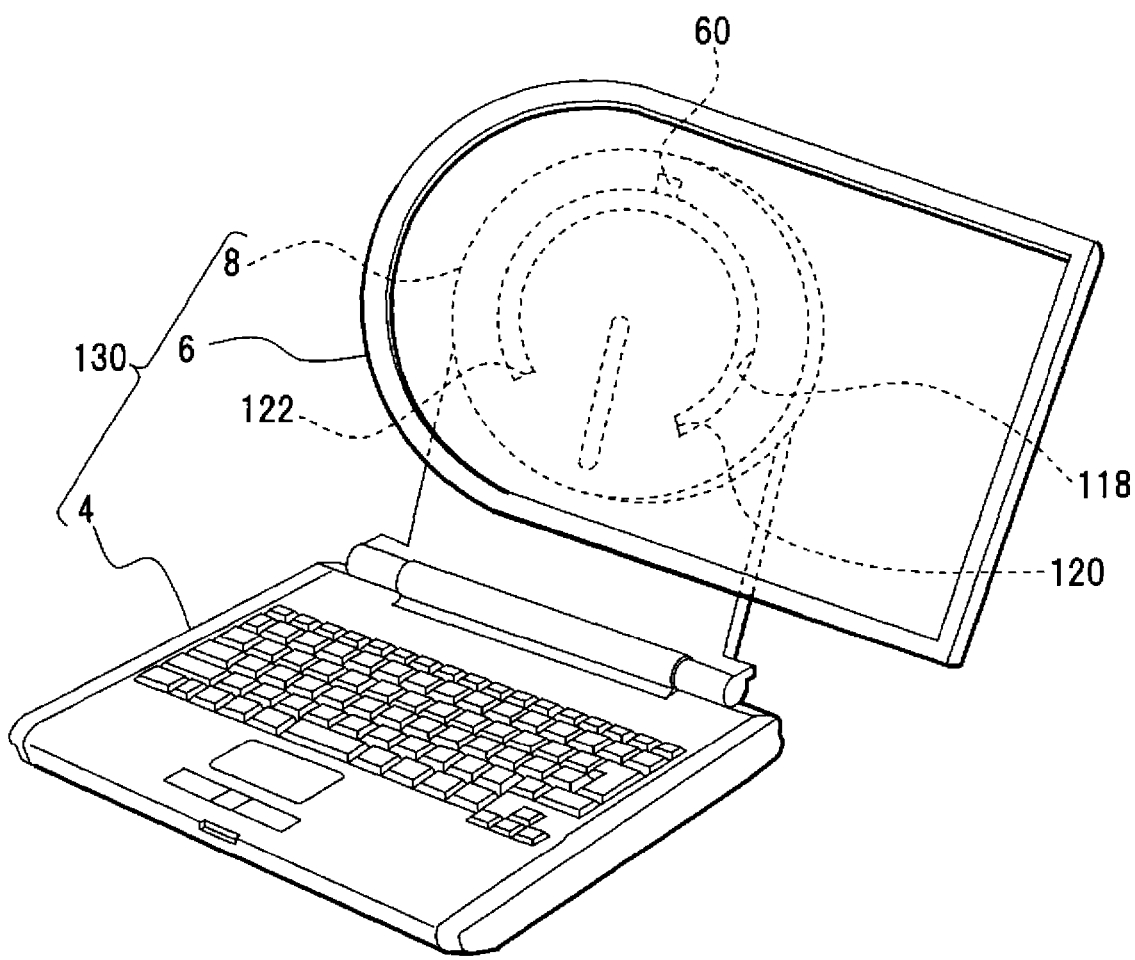
FIG. 22 depicts a PC according to further embodiment.
Figure 23:
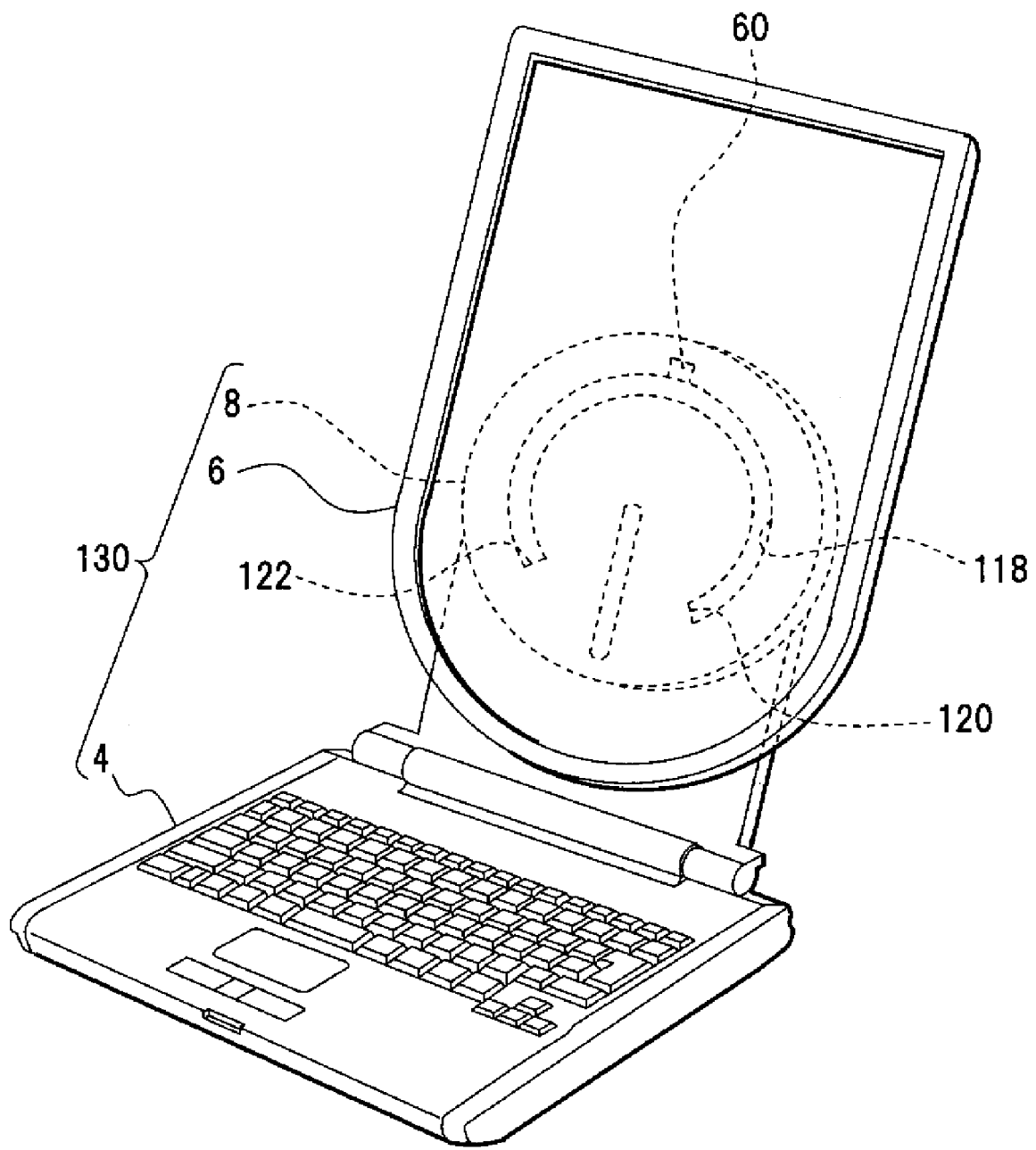
FIG. 23 depicts a PC according to further embodiment.

Other Embodiments (1) Though the portable terminal apparatus 2 is exemplified as an electronic apparatus in the above embodiments, the present invention is also applicable to a personal computer (PC) 130 as shown in FIGS. 22 and 23. In FIGS. 22 and 23, the components same as those in FIGS. 1 to 8 and 16 are given the same reference numerals. In this case, for the PC 130, the movable housing unit 6 can be disposed in a vertically oriented posture relative to the fixed housing unit 4 (FIG. 22) or the movable housing unit 6 can be disposed in a horizontally oriented posture relative to the fixed housing unit 4 (FIG. 23). The same effects can be expected when the present invention is applied to the PC 130.

(2) Though the portable terminal apparatus 2 and the PC 130 are exemplified as the electronic apparatus in the above embodiments, the present invention is applicable to a remote controlling apparatus or a gaming apparatus, etc., that each include a movable unit.

(3) Though the rotation locking mechanism 60 that includes the pin engaging portion 64 for the movable housing unit 6 and the locking pin 66 for the movable arm unit 8 is exemplified in the above embodiments, the rotation locking mechanism 60 according to the present invention is directed to realize rotation locking between the supporting frame unit and the housing unit. Therefore, the same effects can be expected even when either the pin engaging portion 64 or the locking pin 66 is used for either the supporting frame unit or the housing unit. Therefore, the present invention is not limited to the above embodiments.

As above, the description has been given for the most preferred embodiments of the present invention. However, the present invention is not limited to the above description. Those skilled in the art can surely make various modification and changes thereto based on the purport of the present invention described in the appended claims or disclosed herein. Such modifications and changes are surely included in the scope of the present invention.

The present invention relates to an electronic apparatus such as a portable terminal apparatus having a rotatable displaying unit such as a liquid crystal displaying unit and, according thereto, a movable housing unit that mounts the displaying unit can be locked at predetermined angles and, therefore, fixation precision at predetermined angles can be improved and saccadic movement can be prevented, etc. Therefore, the present invention is useful.

What is claimed is:

1. An electronic apparatus, comprising:
a supporting frame unit;
a rotation supporting unit installed on the supporting frame unit;
a housing unit that is fixed on the rotation supporting unit and can be rotated by the rotation supporting unit; and
a rotation locking mechanism that is installed away from the center of rotation of the rotation supporting unit and, in case where the housing unit is rotated to a predetermined angle, holds the supporting frame unit and the housing unit in a locked state,
wherein the rotation locking mechanism includes a locking pin, a pin engaging portion that engages with the locking pin, and an elastic portion that exerts an elastic force on the locking pin or the pin engaging portion,
the elastic portion is in a compressed state if the locking pin and the pin engaging portion contact each other, and is in a released state if the locking pin and the pin engaging portion do not contact each other, and
the locked state between the supporting frame unit and the housing unit is generated by engagement between the locking in and the pin engaging portion, and the compressed state of the elastic portion.

2. The electronic apparatus of claim 1, wherein
rotating faces respectively of the supporting frame unit and the housing unit are closely contacted slidably with each other.

3. The electronic apparatus of claim 1, wherein
the apparatus comprises the pin engaging portion on the supporting frame unit or the housing unit, and the locking pin on the housing unit or the supporting frame unit, wherein
the elastic portion exerts an elastic force on the pin engaging portion, the locking pin or both thereof.

4. The electronic apparatus of claim 1, further comprising:
a grooved portion into which the pin engaging portion is inserted, the pin engaging portion being moved by the rotation of the housing unit, in the face of the housing unit or the supporting frame unit; and
the locking pin that is slid against the pin engaging portion in the direction of the radius of the rotation of the housing unit, inside the supporting frame unit or the housing unit.

5. The electronic apparatus of claim 1, further comprising:
stopper mechanisms at the starting point of rotation and the ending point of the rotation of the housing unit in the supporting frame unit and/or the housing unit.

6. The electronic apparatus of claim 1, wherein
the housing unit comprises a displaying unit.

7. The electronic apparatus of claim 1, further comprising:
an opening and closing mechanism coupled with the supporting frame unit; and
a fixed housing unit coupled with the supporting frame unit through the opening and closing mechanism, wherein
the supporting frame unit can be opened and closed with folding against the fixed housing unit by the opening and closing mechanism.

8. The electronic apparatus of claim 1, wherein
the pin engaging portion comprises a recessed portion into which the locking pin is engaged.

9. The electronic apparatus of claim 1, wherein
the rotation locking mechanism is installed at a position, which is opposite to an opening and closing mechanism and sandwiches the center of the rotation of the rotation supporting unit with the opening and the closing mechanism.

10. The electronic apparatus of claim 1, wherein
the elastic portion is a spring.

11. The electronic apparatus of claim 1, further comprising:
a sliding sheet between sliding faces respectively of the supporting frame unit and the housing unit.

12. The electronic apparatus of claim 5, wherein
the stopper mechanism comprises a grooved portion and the pin engaging portion.

13. A portable terminal apparatus, comprising:
a movable arm unit fitted being able to be opened and closed to a fixed housing unit with an opening and closing mechanism installed therebetween;
a rotation supporting unit installed in the movable arm unit;
a movable housing unit that is fixed to the rotation supporting unit and can be rotated by the rotation supporting unit; and
a rotation locking mechanism that is installed away from the center of rotation of the rotation supporting unit and outside the rotation supporting unit and, in case where the movable housing unit is rotated to a predetermined angle, holds the movable arm unit and the movable housing unit in a locked state,
wherein the rotation locking mechanism includes a locking pin, a pin engaging portion that engages with the locking pin, and an elastic portion that exerts an elastic force on the locking pin or the pin engaging portion,
the elastic portion becomes a compressed state if the locking pin and the pin engaging portion contact each other, and becomes a released state if the locking pin and the pin engaging portion do not contact each other, and
the locked state between the movable arm unit and the movable housing unit is generated by the engagement between the locking pin and the pin engaging portion, and the compressed state of the elastic portion.

14. The portable terminal apparatus of claim 13, wherein
rotation faces respectively of the movable arm unit and the movable housing unit are closely contacted slidably with each other.

15. The portable terminal apparatus of claim 13, wherein
the apparatus comprises the pin engaging portion on the movable arm unit or the movable housing unit, and the locking pin on the movable housing unit or the movable arm unit, wherein
the elastic portion exerts an elastic force on the pin engaging portion, the locking pin or both thereof.

16. The portable terminal apparatus of claim 13, further comprising:
a grooved portion into which the pin engaging portion is inserted, the pin engaging portion being moved by the rotation of the movable housing unit, in the face of the movable housing unit or the movable arm unit; and the locking pin that is slid against the pin engaging portion in the direction of the radius of the rotation of the movable housing unit, inside the movable arm unit or the movable housing unit.

17. The portable terminal apparatus of claim 13, further comprising:

stopper mechanisms at the starting point of rotation and the ending point of the rotation of the movable housing unit in the movable arm unit and/or the movable housing unit.

18. The portable terminal apparatus of claim 13, wherein the movable housing unit comprises a displaying unit.

19. The portable terminal apparatus of claim 13, wherein the pin engaging portion comprises a recessed portion into which the locking pin is engaged.

20. The portable terminal apparatus of claim 13, wherein the rotation locking mechanism is installed at a position, which is opposite to the opening and closing mechanism and sandwiches the center of the rotation of the rotation supporting unit with the opening and the closing mechanism.

21. The portable terminal apparatus of claim 13, wherein the elastic portion is a spring.

22. The portable terminal apparatus of claim 13, further comprising:

a sliding sheet between sliding faces respectively of the movable arm unit and the movable housing unit.

23. The portable terminal apparatus of claim 17, wherein the stopper mechanism comprises a grooved portion and the pin engaging portion.

* * * * *